INVENTORS L. A. HOHMANN, JR.
L. L. MAUL
G. W. WELLS
BY Howard C Popper
ATTORNEY

Jan. 9, 1968 L. A. HOHMANN, JR., ET AL 3,363,062

TELEPHONE SWITCHING SYSTEM HAVING ELECTRONIC FINDER-CONNECTOR LINK CIRCUIT

Filed Oct. 7, 1964 11 Sheets-Sheet 3

Jan. 9, 1968 L. A. HOHMANN, JR., ET AL 3,363,062

TELEPHONE SWITCHING SYSTEM HAVING ELECTRONIC FINDER-CONNECTOR LINK CIRCUIT

Filed Oct. 7, 1964 11 Sheets-Sheet 4

Jan. 9, 1968 L. A. HOHMANN, JR., ET AL 3,363,062

TELEPHONE SWITCHING SYSTEM HAVING ELECTRONIC FINDER-CONNECTOR LINK CIRCUIT

Filed Oct. 7, 1964 11 Sheets-Sheet 7

Jan. 9, 1968 L. A. HOHMANN, JR., ET AL 3,363,062

TELEPHONE SWITCHING SYSTEM HAVING ELECTRONIC FINDER-CONNECTOR LINK CIRCUIT

Filed Oct. 7, 1964 11 Sheets-Sheet 9

Jan. 9, 1968 L. A. HOHMANN, JR., ET AL 3,363,062
TELEPHONE SWITCHING SYSTEM HAVING ELECTRONIC FINDER-CONNECTOR LINK CIRCUIT
Filed Oct. 7, 1964 11 Sheets-Sheet 11
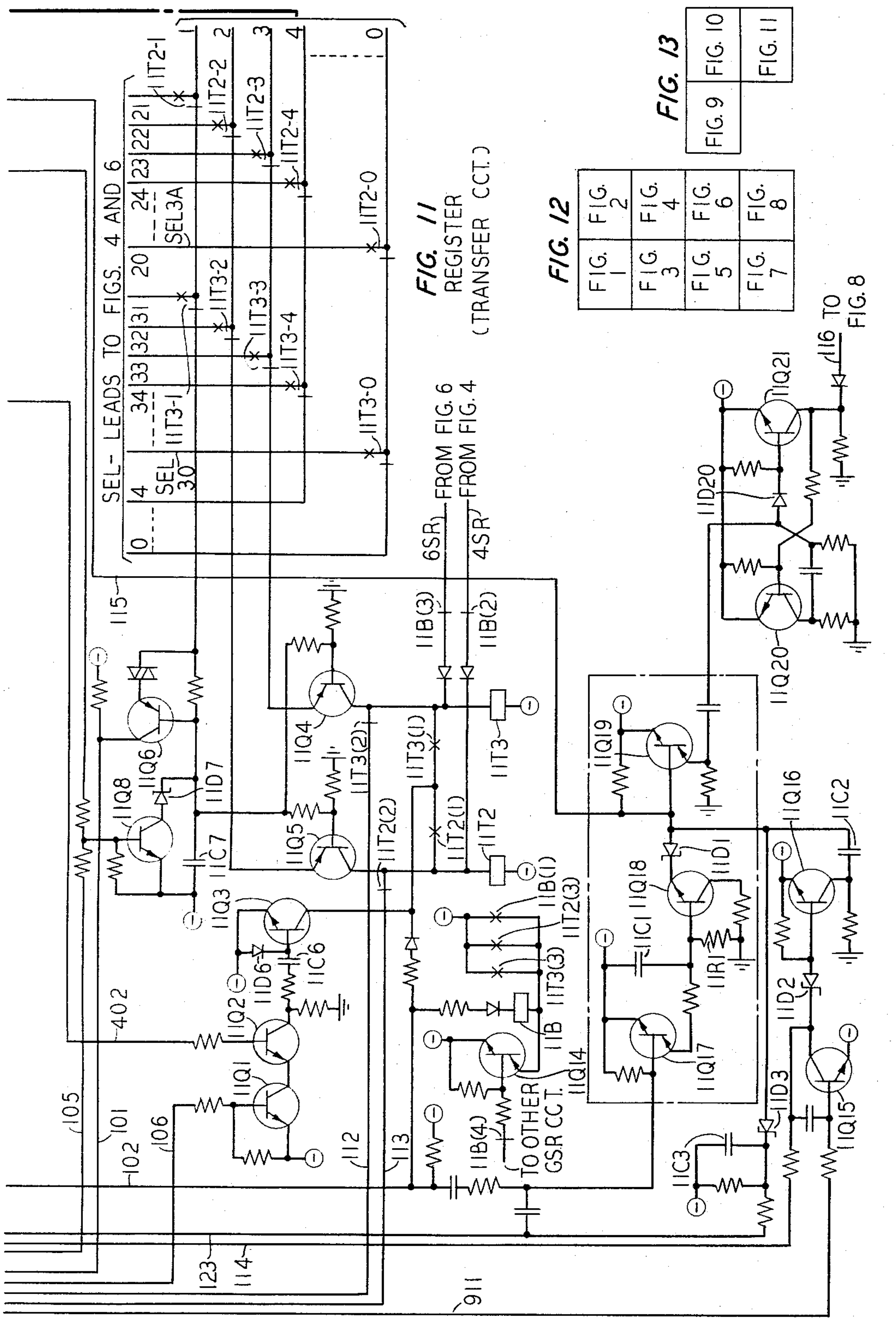
FIG. 11 REGISTER (TRANSFER CCT.), FIG. 12, FIG. 13

United States Patent Office 3,363,062

Patented Jan. 9, 1968

3,363,062

TELEPHONE SWITCHING SYSTEM HAVING ELECTRONIC FINDER-CONNECTOR LINK CIRCUIT

Lawrence A. Hohmann, Jr., Middletown, and Lloyd L. Maul and George W. Wells, Lincroft, N.J., assignors to Bell Telephone Laboratories, Incorporated, New York, N.Y., a corporation of New York Filed Oct. 7, 1964, Ser. No. 402,073

10 Claims. (Cl. 179—18)

ABSTRACT OF THE DISCLOSURE

A telephone switching system is disclosed in which each of the telephones has a station circuit giving it multiple appearances in a coordinate array of communication links. Each station circuit includes a crosspoint relay per link. An idle link is assigned when one of the telephone circuits requests service and a current-pulse-applying circuit arrangement finds the service requesting circuit by detecting which of the telephone circuits provides a loop current path for the current pulse. A responsive circuit arrangement then completes a path to the assigned link to divert the current into the crosspoint relay of the station circuit associated with the assigned link. The current-pulse-applying circuit is then released and rendered available to receive call signaling information subsequently transmitted from the station circuit into the assigned link. Responsive to the call signaling information, the current-pulse-applying circuit then operates the crosspoint relay in the link identified by the call signaling information. Calling and called stations are thereby connected over the link.

This invention relates to telephone switching systems and more particularly to small private branch exchange and intercommunicating switching systems.

The term private branch exchange has grown up in the telephone art to mean a small, self-contained switching system which permits the various telephone stations to place calls both to each other and to other telephones in the telephone switching network, the latter by means of outgoing trunks to a central office. The term intercom system, on the other hand, generally relates to a system that is divorced from connections to or from a central office and that may permit or require station conferencing type calls to be made. Intermediate these two extremes, are key telephone systems which include a plurality of telephone stations having pick-up keys for one or more trunks incoming from the central office and also dependent or tributary telephone stations which do not have key access to trunks and which, therefore, are dependent upon the telephone stations having such pick-up keys. The private branch exchange switching systems and the more sophisticated of the intercom systems permit a plurality of telephone conversations to simultaneously take place. The key telephone systems, however, permit only as many simultaneous conversations involving trunks to take place as there are pick-up keys provided.

Although the foregoing distinctions between private branch exchanges and intercom systems are clear, it has become common practice to refer to calls established between extension telephone stations of a PBX as intercom calls even though the PBX is capable of establishing connections between its stations and central office lines.

For some time there has been a need to increase the flexibility of service provided to private branch exchange and intercom telephone systems having from ten to fifty telephone stations. The need has been perceived for a system which would permit one or more extension telephone stations to be added into a connection already existing between a central office line and another extension telephone station. Similar need has been perceived for the capacity to add in a central office trunk line to a connection established between another central office trunk line and an extension telephone and even to add a central office trunk line to a so-called intercom connection established between two extension telephone stations. It is desirable to insure the privacy of and noninterference with established connections and also to insure freedom from interference during the initial setting up of any particular type of connection responsive to a service request therefor. The present invention is concerned with achieving a system exhibiting the aforementioned desirable attributes or service features without sacrificing economy and simplicity of design or reliability of operation.

In accordance with one illustrative embodiment of the present invention, a telephone switching system is provided capable of being employed as a private branch exchange, key telephone system, or intercom switching system. A coordinate switching array is employed wherein the horizontals comprise a plurality of station card circuits and central office trunk link card circuits and wherein the verticals comprise a plurality of link circuits for effecting interconnections among the trunk line and station card circuits. Each card carries at least one link crosspoint relay for connecting the associated line circuit with one of the links.

The card circuit for stations in the switching array provides a connection to the tip and ring of the station loop and also a coupling impedance between the station loop and the "sleeve" lead. Upon a service requesting station going off-hook, the switchhook contact establishes continuity between the tip and ring thereby permitting a low value of loop current to flow. A group detector circuit serving a number of the station card circuits responds to this value of loop current and signals an allotter to connect a register to an idle link. The register scans the "sleeve" leads of each station card circuit by applying a pulse thereto. The pulse applied to the "sleeve" lead of each station card circuit is connected through the coupling impedance to one side of the station loop circuit. At the off-hook, service requesting station, the station loop provides a complete current path for the pulse. At off-hook stations which are already connected to a link, the contacts of the operated link crosspoint relay which priorly transferred the station loop to the link isolate the pulsed sleeve from the station loop, preventing the completion of a pulse current path. The winding of each link crosspoint relay carried by a station card is connected between the sleeve lead and an operate conductor of the respective link. When the pulsing of a station card sleeve results in the conduction of current, the register detects this condition and completes a low impedance connection to the link operate conductor of the assigned link, thereby completing a branch circuit path for the sleeve current through the winding of a particular link crosspoint relay. The link crosspoint relay operates, transferring the station loop of the service requesting station to the link.

It is a particular aspect of the switching arrangement that the register, which is assigned to an idle one of the links responsive to a service request from one of the stations and which firsts performs the functions of a line finder to connect that station to the link, thereafter functions as a selector-connector under the control of transmitted dial pulses to connect a called station to the same link. The register is not required, however, to remain on the connection throughout the ringing interval.

Once a service requesting station has been connected to a link, dial tone is returned by the register over the link permitting the station to dial the number of any other intercom station. The dial pulses are received by the register in a counting circuit which during the line finder operation, operated in a free-running manner. Under the dialing connection, however, the counting circuit is controlled by the dial pulses transmitted and causes the register to pulse only the sleeve lead of the called intercom station. The crosspoint relay of the called station operates, ringing is applied over the link, and the register is released. If the called intercom station is busy, the link crosspoint relay connecting it to some other link opens the sleeve operating path to the crosspoint relay of the link in question, thereby preventing its operation. If, however, the called station is idle, its crosspoint relay for the appropriate link is operated responsive to the sleeve pulsing. The operation of the crosspoint relay of the called intercom station is sensed by a transistor circuit in the link which applies ringing. Ringing continues to be applied under control of the link until the called intercom station answers or the call is abandoned.

After a connection has been established between two stations over a particular link, either station may recall the register to the link for the purpose of transmitting thereto the number of any other desired intercom station. This request for a register signals the allotter to connect a register to the indicated link instead of hunting for an idle link as in response to an original service request. The register so connected is controlled by the digits dialed by either of the stations already connected to the link to operate the crosspoint relay of the new station. The talking path of the link is thereupon extended to that station.

The switching system is further adapted to operate with telephone stations whether or not they are all of the type which have pick-up keys for central office trunk lines. A line circuit associated with each central office trunk line incoming to the switching system displays its condition before a respective trunk pick-up key on one or more of the telephone sets having pick-up keys. The call is answered by a station user operating the appropriate pick-up key at one of the stations. Upon ascertaining the number of the desired intercom station, the trunk is placed on hold and the intercom key at the answering station is operated. This generates a service request to the switching system to assign a register to an idle link of the switching array, whereupon dial tone is returned to the station user's telephone. The station user then dials the number of the desired intercom station and is connected to that station over the assigned link. The station user then operates an add-on key to remove the hold condition from the trunk without the necessity of re-operating the original trunk pick-up key. The central office trunk line is thereby connected to the same link over which the original answering station reached the desired intercom station. Thereafter, the original answering station may be placed on-hook. Conversation continues between the central office trunk party and the intercom station who may add in other intercom stations as desired whether or not it is itself equipped with any trunk pick-up keys. If it is so equipped, it may originate and add in other central office trunk line calls to the first trunk line call and thereby accomplish central office trunk line conferencing. If the intercom station does not itself have any trunk pick-up keys, it may nevertheless be employed to establish an intercom call to a station so equipped whereupon the latter may originate the additional central office calls. According to this portion of system operation, a central office line is connected in conversation with an intercom station without requiring the register to mark or pulse any appearance of the central office line in the switching apparatus. The register is used only to mark the appearance of the desired intercom station.

Alternatively, it is also possible for the original answering station to be connected to the calling trunk line at its switching equipment appearance without first dialing another intercom station. This is accomplished (after the calling trunk line has been placed on "hold" at the answering station) by the station user operating the intercom key and then the add-on key. In this case the register is used only to connect the answering station to an idle link, following which, the operation of the add-on key connects the switching equipment appearance of the calling trunk line to that link.

Accordingly, it is a feature of the present invention that a service requesting one of a plurality of stations be found by selectively pulsing the sleeve leads thereof and by detecting current flow in the sleeve lead associated only with the service requesting one of the stations.

It is a further feature of the present invention that a coupling impedance connect the sleeve lead of each station to the station loop thereof for providing a current path thereover when the associated station is off-hook.

It is a further feature of the present invention that a link crosspoint relay connected to the sleeve lead be enabled to provide a branch path for sleeve current responsive to the register's detecting this sleeve current and that the current in the branch path operate the crosspoint relay.

It is a still further feature of the present invention that a register operate as a line finder responsive to an original service request and thereafter operate as a selector-connector under control of called number dial pulses.

Still another feature of the present invention is a register having free-running access to the sleeve leads of the station circuits in a switching arrangement for finding a service requesting line and which is thereafter selectively controlled by that station to mark the sleeve lead of a called station.

It is a further feature of the present invention that a register may be recalled once communication has been established over a link at the request of either of the stations connected to the link. It is a further feature of this operation that the recall of the register is obtained without requiring the register to hunt for any particular one of the recalling stations.

Another feature of the present invention is means permitting a station having pick-up keys for central office trunk lines to select one thereof independently of the switching arrangement and thereafter to employ a link of the switching arrangement to connect that trunk line to any other intercom station or to another central office trunk.

The foregoing and other objects and features may become more apparent from the following description when read together with the drawing in which.

Figure 9:
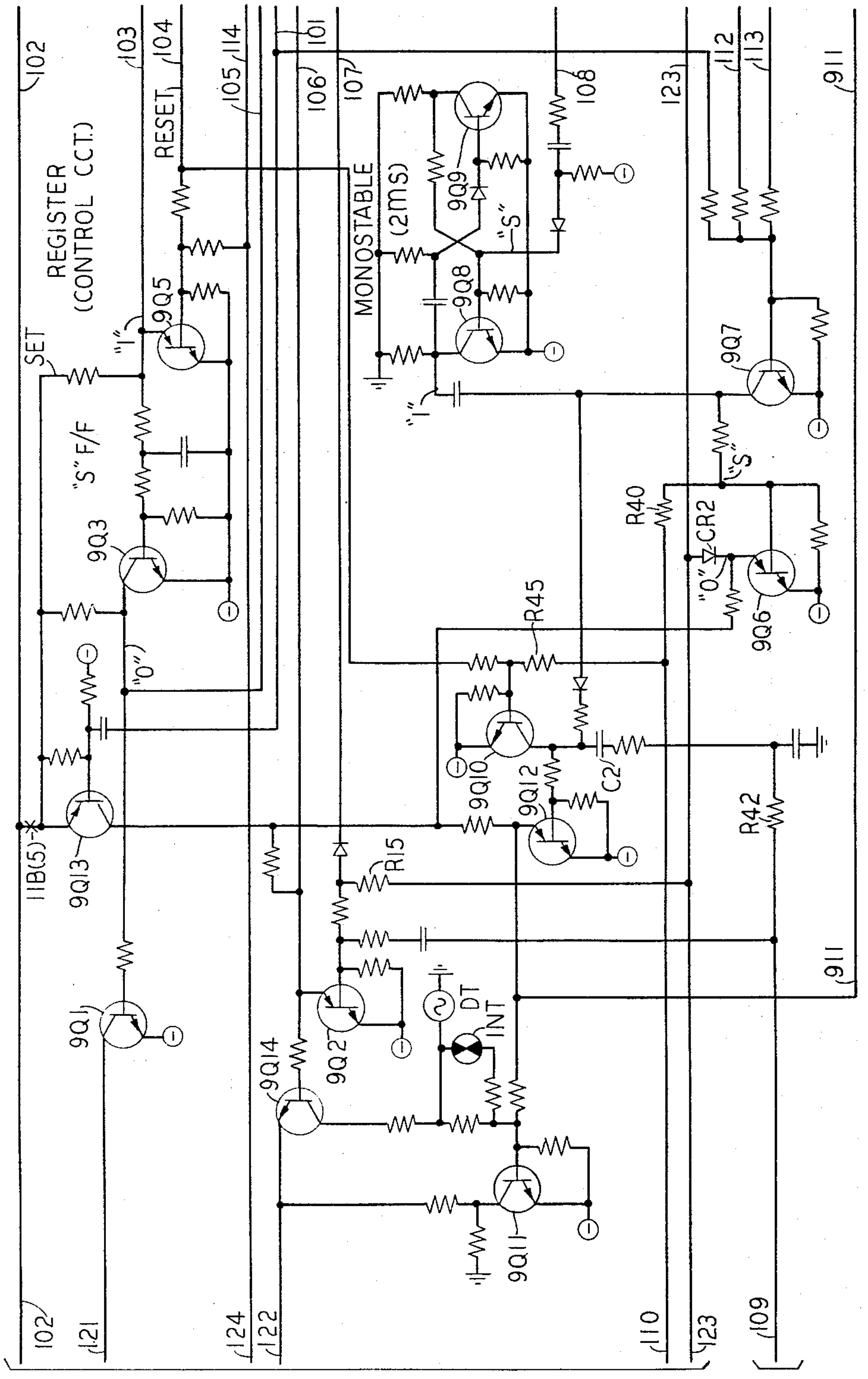
Figure 10:
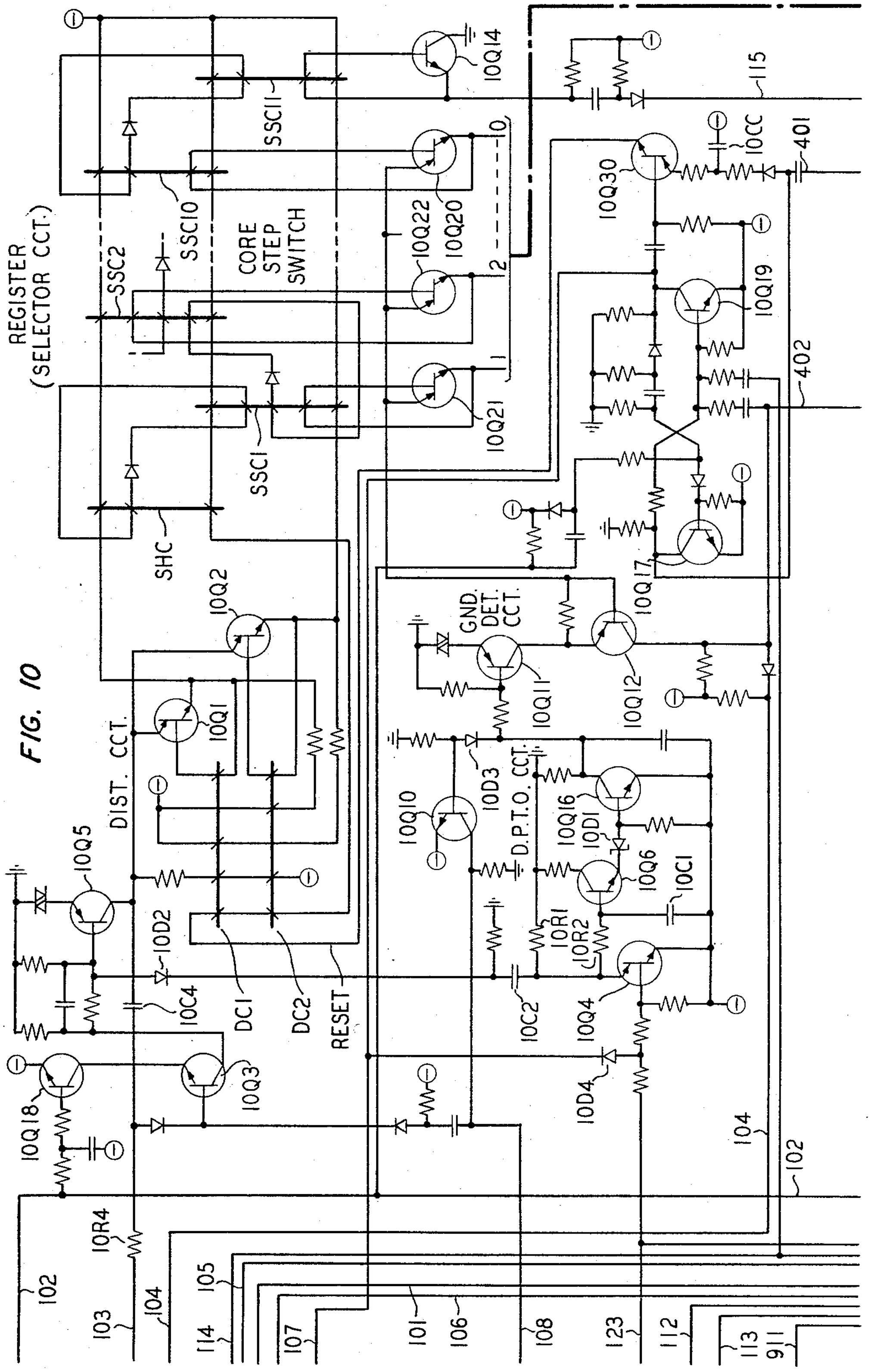

FIGS. 9 through 11 shown the control, selector, and transfer circuits of the register;

FIG. 12 shows how FIGS. 1 through 8 should be arranged; and

FIG. 13 shows how FIGS. 9 through 11 should be arranged.

CONTENTS

| | Column |
|---|---|
| Intercom Calls | 5 |
| Register Recall | 9 |
| Station Call to Trunk | 9 |
| Switchhook Flash Operation | 10 |
| Direct Outward Dialing | 11 |
| DSS Operation | 12 |
| Register Operation, Dial Tone Connection | 12 |
| Register Operation, One-Digit Dialing | 14 |
| Register Operation, Two-Digit Dialing | 16 |
| Register Operation, Direct Station Selection | 17 |
| Register Operation, Dial "1" Cancellation | 17 |
| Register Operation, Permanent Signal Release | 18 |
| Register Operation, Miscellaneous Features | 18 |

Figure 3:
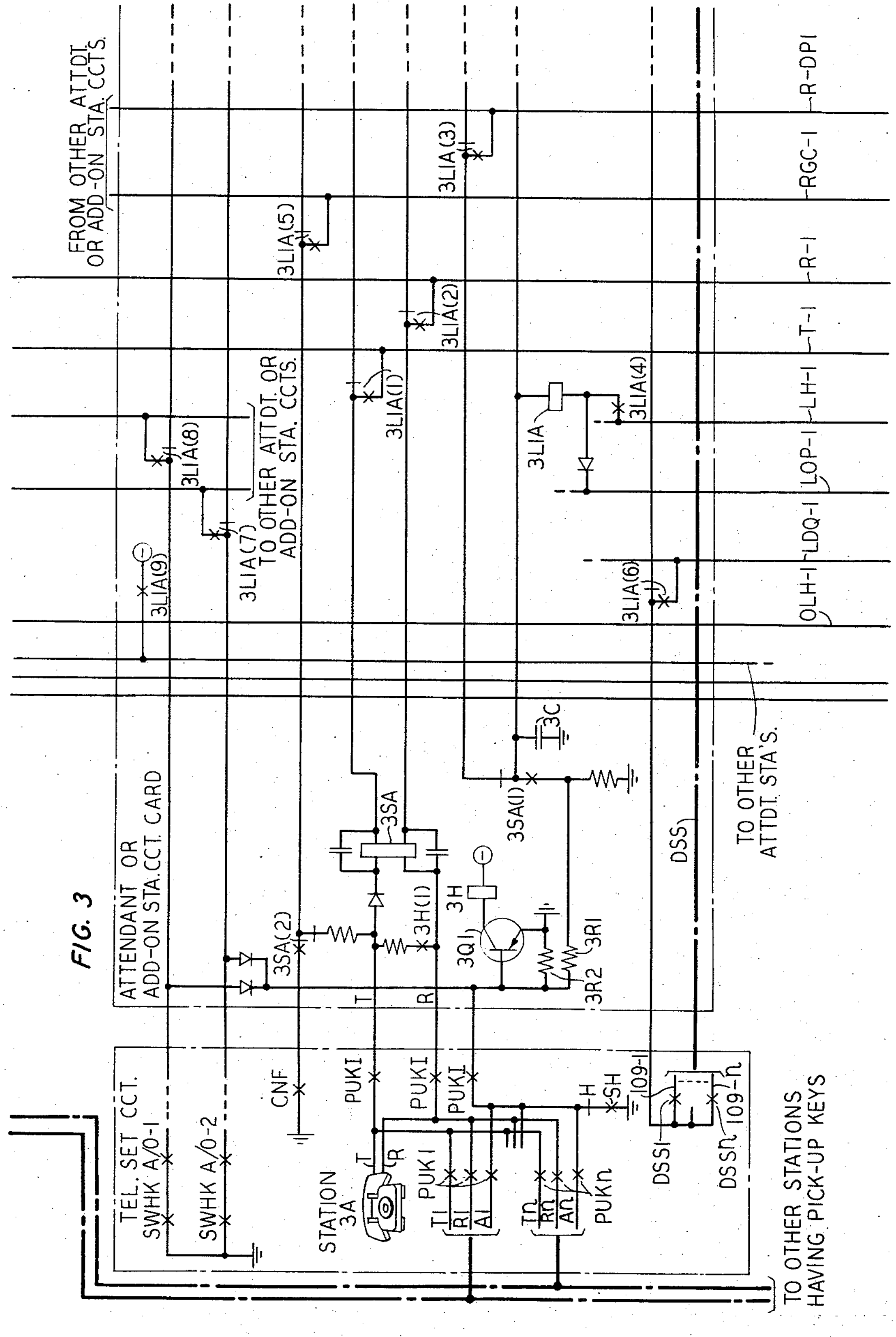
Figure 4:
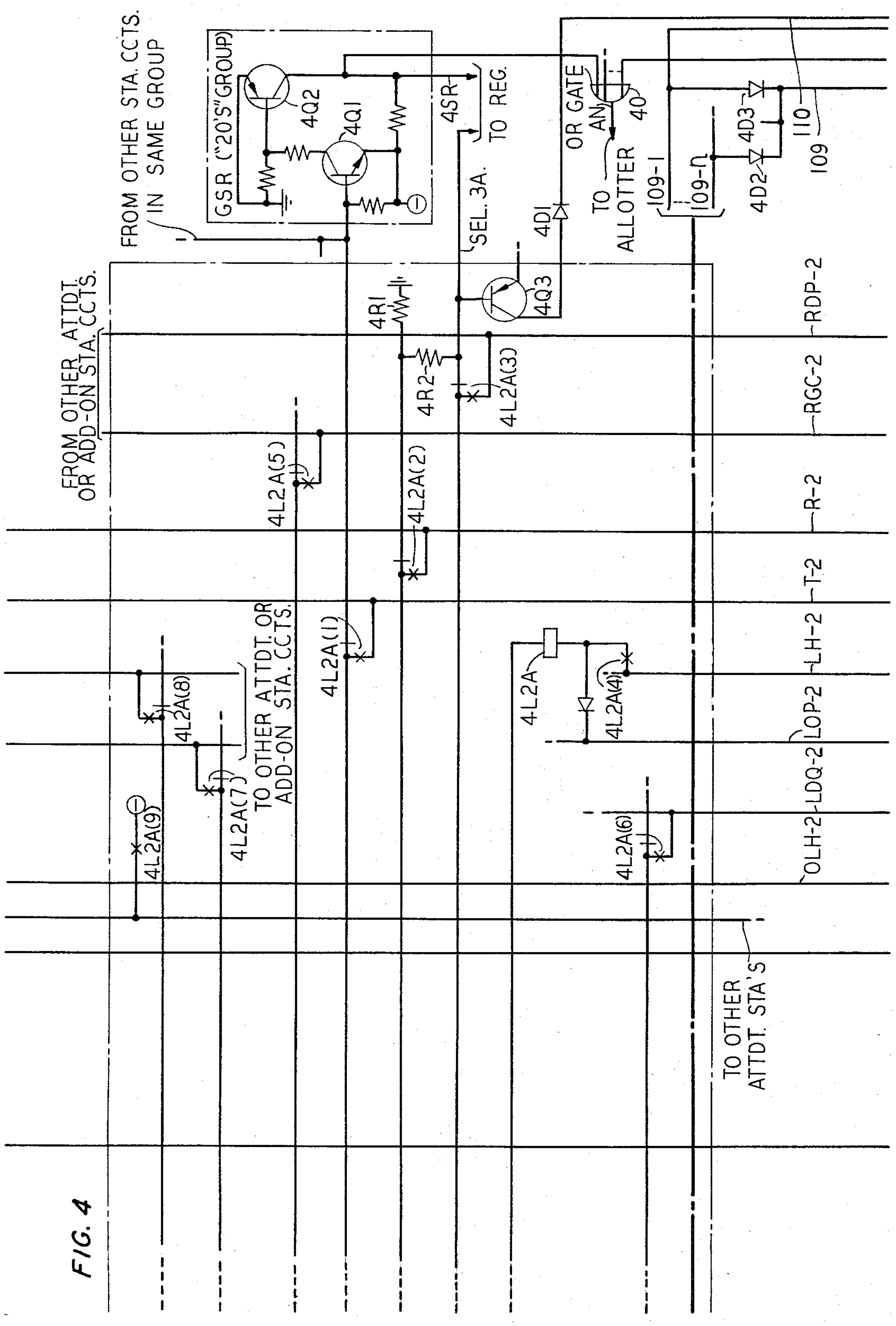
Figure 5:
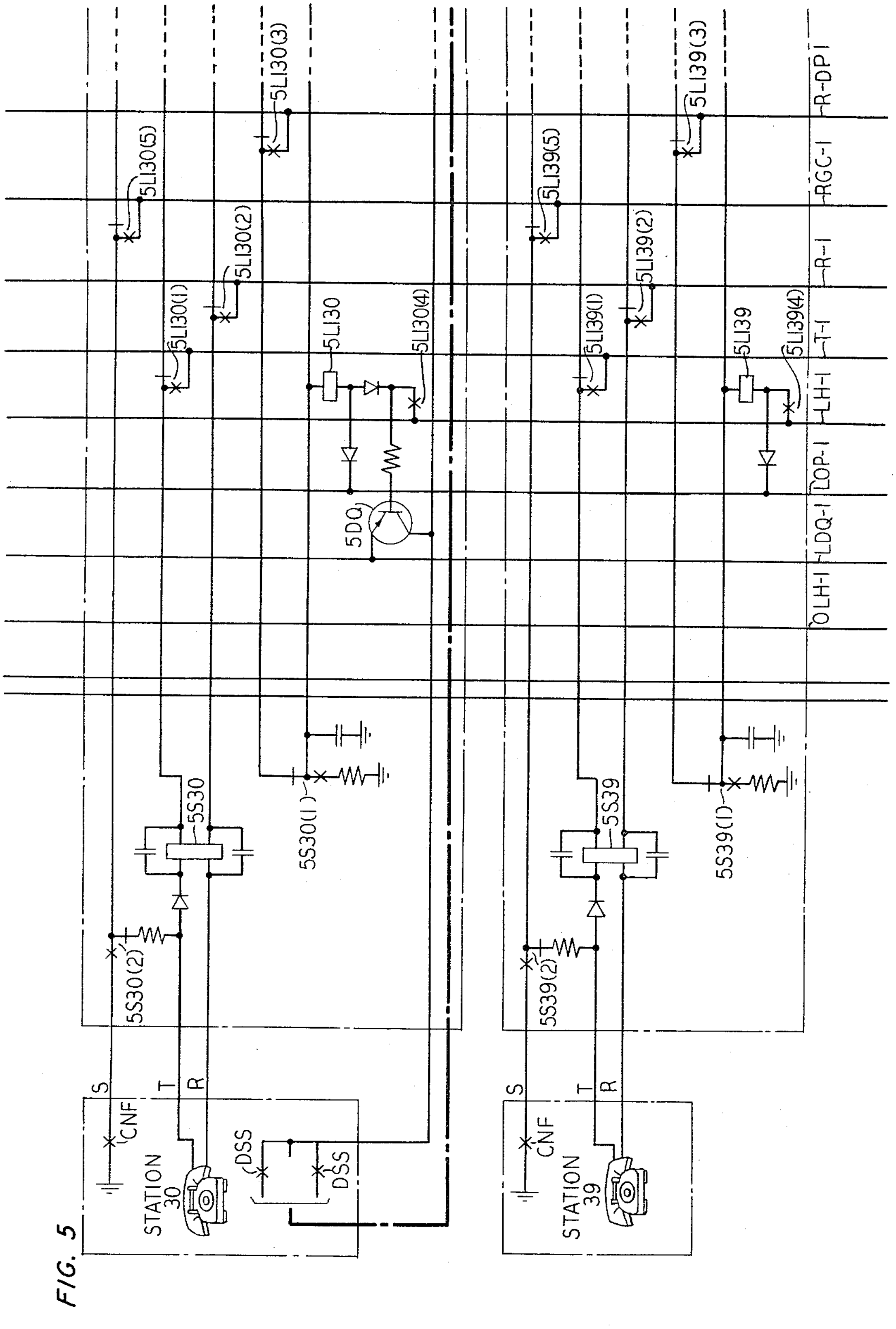
Figure 6:
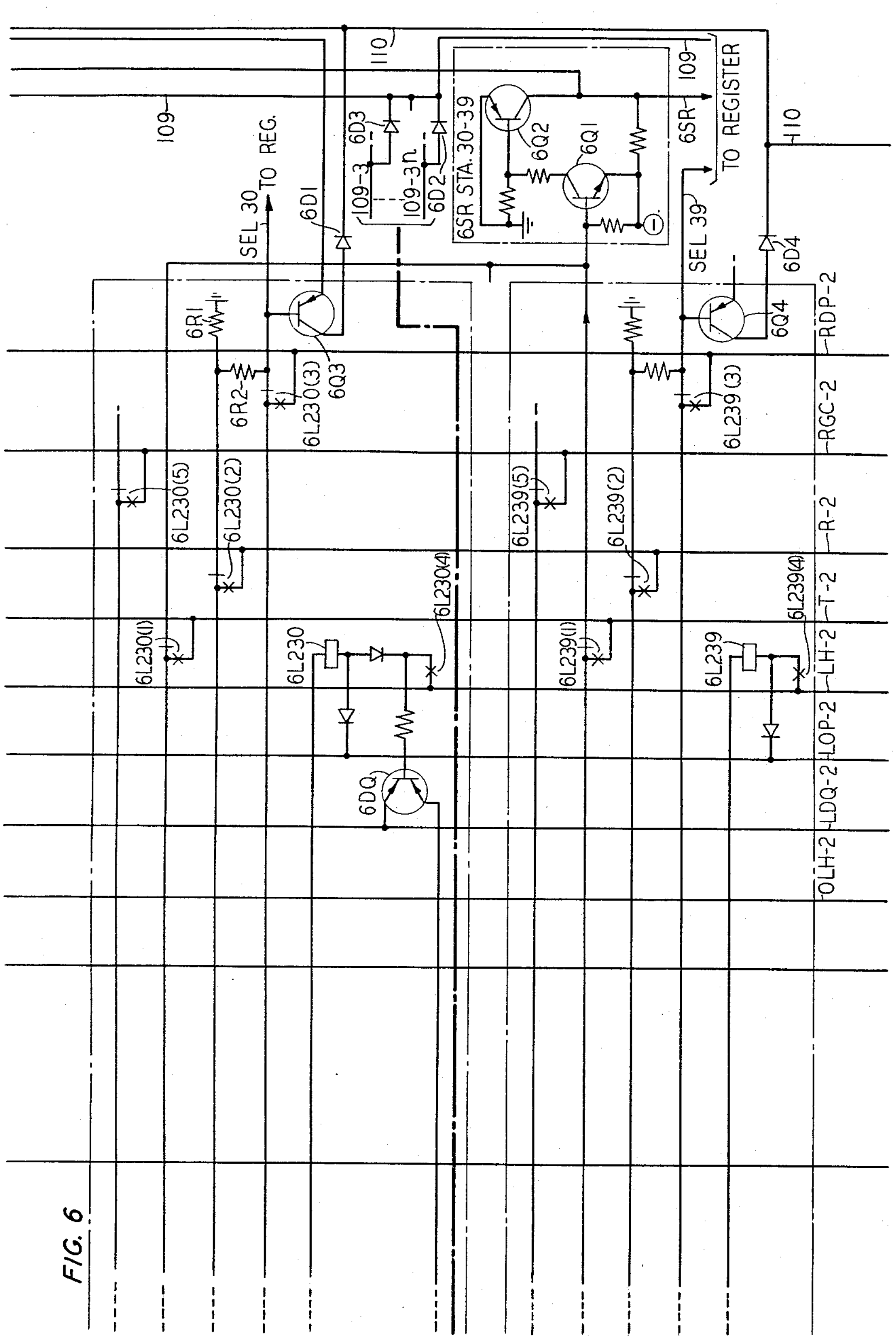

The plurality of station circuits comprising the switching arrangement are illustrated in FIGS. 3 and 5 with their associated card circuits, the latter extending into FIGS. 4 and 6, respectively. The stations and station card circuits thus shown are arranged in groups, each group having up to ten stations. Stations 30 through 39 shown in FIG. 5 and their associated card circuitry shown in FIG. 6 constitute the "30's" station group. In FIG. 3 station 3A is shown, but for simplicity, the other stations of its group (the "20's" station group) are omitted. The stations and station cards of the units group and of the "40's" group as well as those of any higher numbered group are omitted from the drawing, it being understood, however, that they may be provided in similar manner to the "20's" group, for example, in any desired alternative embodiment of the invention.

*Intercom calls*

Figure 7:
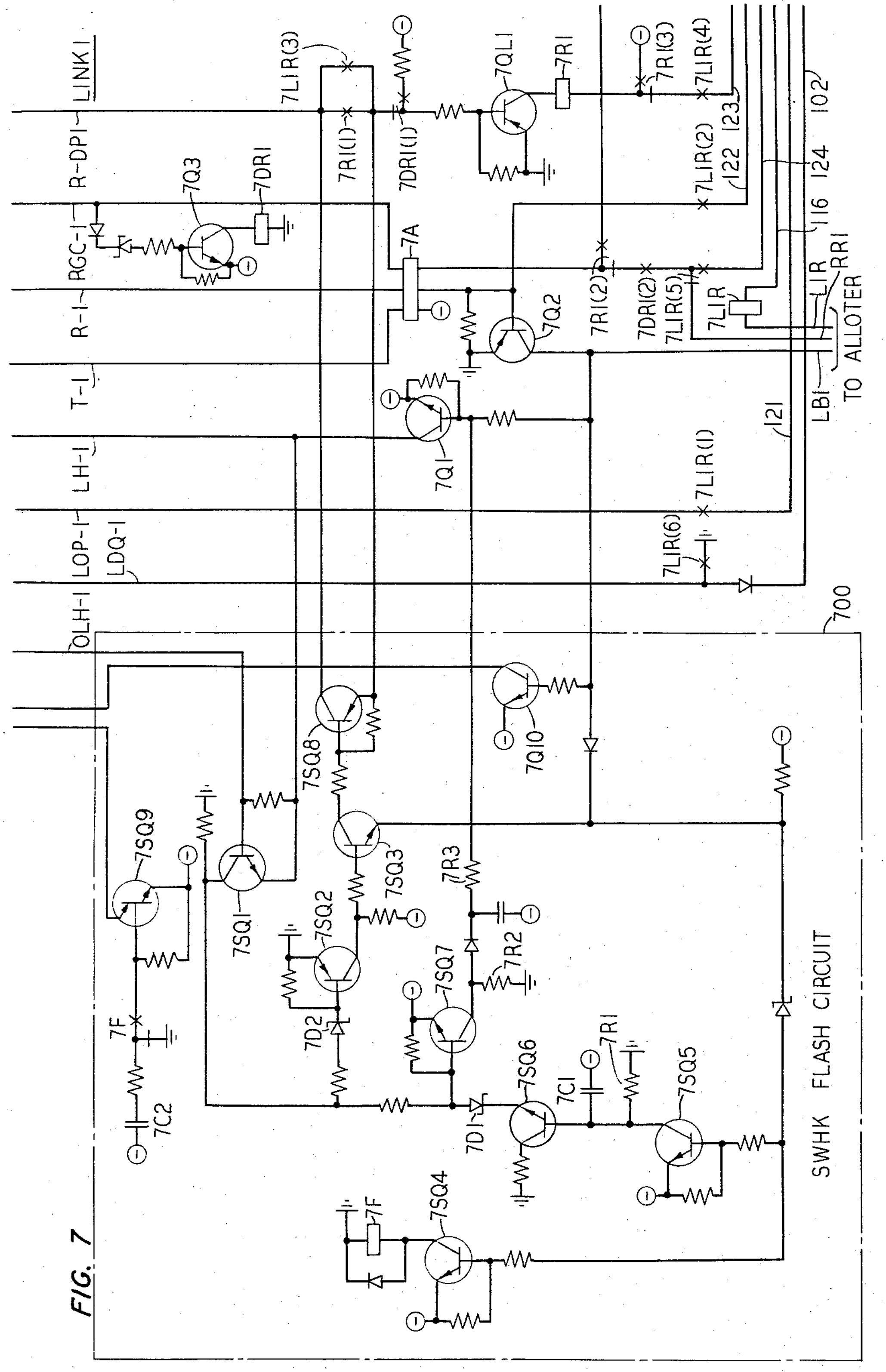
FIGS. 7 and 8 show the link control circuits.

Let it be assumed that station 3A of FIG. 3 has placed its receiver off-hook and that pick-up key PUK1 of the telephone set circuit is operated. This closes the loop between the tip and ring conductors and completes a current path from ground, resistor 4R1 and back contacts 4L2A (1, 2) in FIG. 4, back contacts 3L1A (1, 2) and the windings of relay 3SA in FIG. 3 to the base of transistor 4Q1 in the group detector circuit GSR ("20's" group) of FIG. 4. To the base of this transistor there are also indicated similar connections from other station card circuits in the same group as the station illustrated in FIG. 3. The closure of the station loop turns on transistor 4Q1 which, in turn, turns on transistor 4Q2. Transistor 4Q2 in turning on grounds lead 4SR to OR gate 40 which in turn grounds lead AN to the allotter (not shown). The allotter, which may take the form of any well-known circuit arrangement, selects an idle one of the links and operates the associated link allotter relay of FIGS. 7 and 8 by applying ground to one of leads L1R–L2R. Battery is applied to the other end of all link allotter relays from the register (FIG. 11) over lead 116. Let it be assumed that link allotter relay 7L1R is operated. In FIG. 7, make contacts 7L1R (1, 2, 4, 5 and 6) are operated, thereby connecting leads 121, 122, 123, 124 and 102 from the register (FIGS. 9–11) to link 1. The vertical conductors of link 1 extend upward from FIG. 7 through FIGS. 5 and 3 to FIG. 1.

The grounding of lead 4SR in FIG. 4 also activates the transfer circuit (FIG. 11) of the register. The transfer circuit connects the ten output leads of the selector portion (FIG. 10) of the register to the ten sleeve leads (only one of which, viz, lead SEL3A, is illustrated in FIG. 4) of the group including lead SEL3A of station 3A. The register contains a sequential pulsing circuit in its selector circuit which sequentially applies a ground pulse to the sleeve leads of the stations in a station group until that sleeve lead is pulsed which is associated with the service requesting station.

Figure 8:
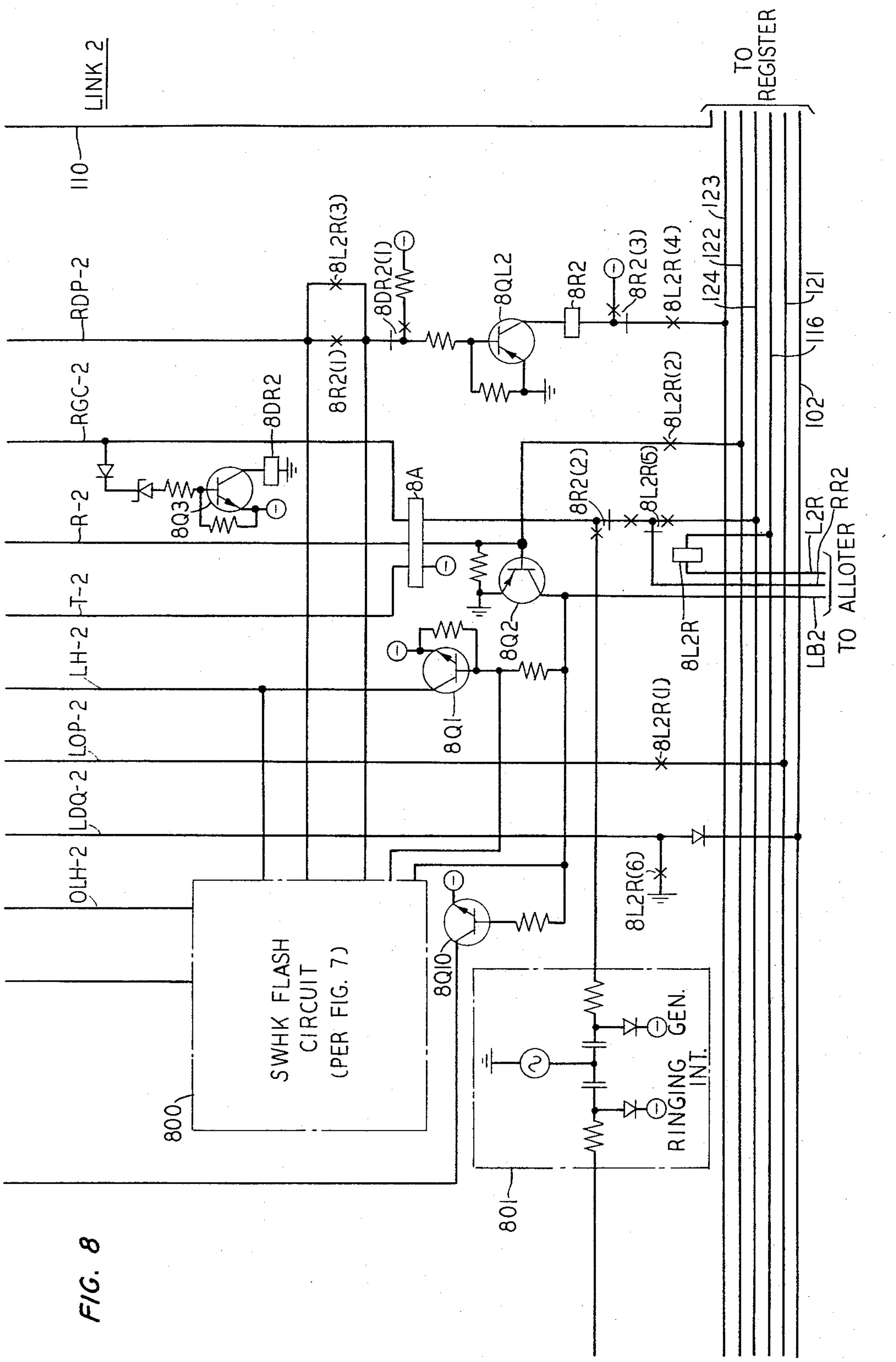

The service requesting station, assumed to be station 3A, provides a complete path for the ground pulse applied to its sleeve lead SEL3A over resistor 4R2 and the completed station loop to battery in the group detector circuit GSR ("20's" group). The detection of current flow in this completed path that is presented to lead SEL3A is made in the register which then applies battery to lead 121 (FIG. 8). Battery applied to lead 121 is continued over operated contact 7L1R(1) to lead LOP–1 and link crosspoint relay 3L1A in FIG. 3 operates. Relay 3L1A operated, at its make contact 3L1A(3), temporarily locks to ground on lead R–DP1, and at its transfer contacts 3L1A(1) and 3L1A(2) connects the tip and ring of the service requesting station to the tip and ring leads of the link. Relay 3L1A operated, at its make contacts 3L1A(4), prepares a (battery) locking path for itself to the link holding lead LH1. Battery will be applied to lead LH1 when transistor 7Q1 is turned on.

It should be noted that battery is not applied to lead 121 (nor, consequently, to lead LOP–1) until the register has detected current flow due to the pulsing of the sleeve lead associated with an off-hook service requesting station. In this manner the link crosspoint relays of stations other than the service requesting station are prevented from being operated even though their sleeve lead may be pulsed.

The manner in which these sleeve leads are pulsed and the manner in which the register detects current flow upon pulsing the sleeve of the service requesting station deserves some additional comment at this point although register operation will be later described separately. The selector circuit (FIG. 10) of the register includes a pnpn transistor switch which is connected in series with the sleeve leads of the stations in a station group by the operation of the transfer circuit. The sequential pulsing circuit of the selector sequentially applies enabling ground pulses to the base of each pnpn transistor switch. That pnpn transistor switch which is connected to the SEL– lead of the service requesting station will receive a negative potential from the associated group detector circuit over the completed station loop circuit. This pnpn transistor switch will turn on in response thereto and current flow through the pnpn switch is detected by other transistors (FIG. 10) which cause the register both to apply battery to lead 121 and to halt and to reset the sequential pulsing circuit.

Battery applied to lead 121 completes a current path through the winding of the link crosspoint relay, which path, viewed from the sleeve lead, is of a lower impedance than that provided by the completed station loop in series with resistor 4R2. A heavier current now flows from the register into the sleeve lead. As soon as relay 3L1A starts to operate sufficiently to interrupt—at its contacts 3L1A(3)—this current path from the register, capacitor 3C provides a momentary ground pulse sufficient to complete the operation of the relay. At this time ground is supplied to the top of the winding of relay 3L1A over make contact 3L1A(3) from lead R–DP1 which obtains its ground in FIG. 7.

The operation of link crosspoint relay 3L1A connects its associated station to link 1 thereby allowing the associated station's supervisory relay 3SA to operate. Relay 3SA is a marginal relay which does not operate from the small loop current present when its associated station is off-hook and before relay 3L1A has been operated. Relay 3SA operated, at its transfer contacts 3SA(1), transfers the holding ground for relay 3L1A from lead R–DP1 to a local resistance ground. The connection of the station to the link transfers the calling station loop from group detector circuit battery and ground to link supply (FIG. 7) and completes a current path to the base of transistor 7Q2, turning this transistor on. Transistor 7Q2 in turning on applies ground at its collector to the base of transistor 7Q1, turning transistor 7Q1 on. Transistor 7Q1 being turned on provides battery to link holding lead LH1. Battery for maintaining the link crosspoint relay operated will be provided through transistor 7Q1 even after the register has been disconnected from the link by the release of link allotter relay 7L1R.

Dial tone is provided to the service requesting station from the register over lead 122, make contact 7L1R(2), and the center winding of link battery feed coil 7A to the ring conductor R–1. The station user at the service requesting station hears dial tone and responsive thereto dials the digits of the desired intercom station.

Let it be assumed that the desired intercom is station 30. The dialing of the first digit "3" causes the station loop to be interrupted three times. Relay 3SA will release and operate with the changes in loop current. As the 3SA relay releases and operates, it alternates the ground holding path for link crosspoint relay 3L1A from the local ground provided over make contact 3SA(1) to the R–DP1 lead ground available over back contact 3SA(1). This ground path is provided through the emitter-base junction of transistor 7QL1 in FIG. 7, back contact 7DR1(1), make contact 7L1R(3), and the make contact of transfer contacts 3L1A(3) in FIG. 3. Transistor 7QL1 operates over this path during each dial pulse. Transistor 7QL1 in turning on during each dial pulse provides a low impedance ground to its collector which is applied to the register through the winding of relay 7R1, back contact 7R1(3), make contact 7L1R(4) and lead 123. The register then responds to these low impedance grounds as repeated dial pulses. In this regard it should be noted that the dial pulses transmitting circuitry of the present invention advantageously repeats low impedance ground pulses instead of station loop "opens" to the register.

The register responds to the dial pulses by controlling its sequential pulsing circuit to operate in step therewith. Neglecting for the moment the differences in register operation when responding to one or two digit called numbers, suffice it to say, in summary fashion, that after an interdigital time-out period, the pnpn transistor switch associated with the station dialed is pulsed. If the station is not busy, the pnpn transistor will apply operate current to the called station's link crosspoint relay associated with the assigned link and latch it up to the link holding lead in a manner which for the sake of simplicity may be assumed to be similar to that described above for the calling station. If, however, the called station is busy, one of its "L" relays will be operated, and at its operated back contact in series with the sleeve lead, will open the path between the called station's sleeve lead and link crosspoint relay preventing it from being operated.

Assuming that called station 30 is idle, its link crosspoint relay will be operated by the current pulse applied to sleeve lead SEL30. Link crosspoint relay 5L130, at its make contact 5L130(3), connects the negative potential available over its winding and back contact 5S30(1) to lead R–DP1 and the base of transistor 7QL1 in FIG. 7. After relay 5L130 operates, the register applies battery to lead 123 and relay 7R1 operates in series with transistor 7QL1 which is enabled by the hold current for relay 5L130. Relay 7R1, at the make contact of its transfer contacts 7R1(2), connects ringing generator through the right-hand winding of feed coil 7A to lead RGC–1 of the link. The ringing current applied through the right-hand winding of coil 7A is, by inductive coupling, applied to the tip and ring conductors T–1, R–1 so that the calling station can hear ringing applied to the called line. Link allotter relay 7L1R is thereupon released by the register thereby disconnecting the register from the link. The register is now free to operate in connection with service requests from any other station.

When link crosspoint relay 5L130 of the called station is operated responsive to the register pulsing of the station card circuit's sleeve lead SEL30, locking ground is provided through the base-emitter junction of transistor 7QL1, FIG. 7. When link allotter relay 7L1R releases, the continuity of the locking ground path is maintained over make contact 7R1(1) even though contact 7L1R(3) is released. One or the other of these paralleled contacts accordingly provides the necessary ground holding paths for the link crosspoint relays while the register is connected or ringing is present.

The operation of relay 7R1, at the make contact of its transfer contacts 7R1(2) shown in FIG. 7, connects the ringing generator to the RGC–1 lead of link 1. Ringing applied to lead RGC–1 is continued over make contact 5L130(5) and back contact 5S30(2) to the tip lead of the station line leading to station 30. When the called station 30 removes the switchhook from the cradle, the station loop is completed between the tip and ring and relay 5S30 operates, its contacts 5S30(2) removing ringing and preparing a path to the conference key of station 30 for subsequent use by the answering party, if so desired. Relay 5S30 operated at its break contact of the transfer contacts 5S30(1) opens the hold current path for relay 7R1 releasing this relay which removes ringing from the link.

When the register is disconnected, the holding path for the operated link crosspoint relays is through the collector-emitter junction of transistor 7Q1 associated with battery feed coil 7A. When station 30 goes off-hook responsive to ringing, its operated supervisory relay 5S30, at its make contact of transfer contacts 5S30(1), maintains a holding ground for its operated link crosspoint relay 5L130. Link crosspoint relay 5L130 operated, at the make contacts of its transfer contacts 5L130 (1, 2), connects the tip and ring of the station line circuit to link 1. Accordingly, station 3A shown in FIG. 3 and station 30 in FIG. 5 are established in communications relationship over link 1.

On the other hand, if station 30 does not answer ringing and the station shown in FIG. 3 disconnects, there will be no continuity between the tip and ring conductors provided by either station. Battery is thereupon removed from the base of transistor 7Q2 turning this transistor off. Transistor 7Q2 turns off transistor 7Q1 which removes battery from the link holding leads. The link crosspoint relays 5L130 and 3L1A thereupon release.

Instead of disconnecting, however, station 3A after waiting a suitable time for called station 30 to answer may, by operating its CNF key in FIG. 3, cause ringing to be removed from the link. Thereafter, the CNF key may be depressed a second time and the number of another station may be dialed. The operation of the CNF key applies ground over make contact 3SA(2), make contact 3L1A(5), and lead RGC–1 to the base of transistor 7Q3 in FIG. 7, turning this transistor on. Transistor 7Q3 in turning on operates relay 7DR1. Relay 7DR1, at the back contact of its transfer contacts 7DR1(1), removes locking ground for the called station's link crosspoint relay that was priorly provided through the emitter-base junction of transistor 7QL1. The called station's link crosspoint relay thereupon releases. Transistor 7QL1, however, is kept on because of the make contact of transfer contact 7DR1(1) connecting the base to local resistance battery. The release of the called station's link crosspoint relay, at its released make contact 5L130(5), disconnects lead RGC–1 and the ringing applied thereto from the called station's line circuit. The calling station's link crosspoint relay is not released by the removal of ground from lead R–DP1 because its crosspoint relay is locked to ground over make contact 3SA(1). It should be noted that although ground is temporarily applied to lead RGC–1 at this time, the operation of make contact 7DR1(2) does not apply a ground over lead RR1 to the allotter because relay 7R1 is still operated, and at the back contact of its transfer contact 7R1(2), isolates lead RR1 from lead RGC–1.

When the CNF key at the calling station is released, ground is removed from lead RGC–1 permitting transistor 7Q3 to turn off and, in turn, to release relay 7DR1. Relay 7DR1 released, at its transfer contact 7DR1(1), transfers the base of transistor 7QL1 from local resistance battery back to lead R–DP1. However, at this time there is no battery potential on lead R–DP1 because the called station's link crosspoint relay was released and the calling station's link crosspoint relay is isolated from lead R–DP1 by back contact 3SA(1). Transistor 7QL1 thereupon turns off, releasing relay 7R1.

If the CNF key be now again depressed, transistor 7Q3 will be turned on once again, operating relay 7DR1. Relay 7DR1 operated, at its make contact 7DR1(2), connects lead RGC–1 over back contact 7R1(2) to lead RR1 over back contact 7L1R(5). The ground on lead RGC–1 is thereby connected over lead RR1 to the allotter which recalls the register to the link by operating relay 7L1R. The register applies dial tone over lead 122 and make contact 7L1R(2) to the link. The calling station may now dial the number of any other intercom station.

Let it be assumed that at this time station 3A desires to call station 39. Station 3A dials the digits of station 39 and in the manner described above the register applies a ground pulse to the sleeve lead SEL39 of station 39, operating its link crosspoint relay 5L139. Assume that the called party at station 39 answers and removes the receiver from the switchhook thereby operating called station supervisory relay 5S39. Relay 5S39 operated, at the back contact of its transfer contacts 5S39(2), removes ringing from the station loop, and at the make contact of its transfer contacts 5S39(1), applies locking ground to relay 5L139. At this time calling station 3A and called station 39 are established in communications relationship over link 1. Relay 7R1 in the link is released by the operation of the back contact 5S39(1) which isolates the emitter-base path of transistor 7QL1 from the battery made available over the winding of the called station's link crosspoint relay 5L139. Relay 7R1 released, at its released contact 7R1(2), isolates lead RGC–1 from the ringing generator, and at its released contacts 7R1(3), removes its locking path to local battery.

*Register recall*

At this time either station 3A or station 39 may operate its CNF key to recall the register to the link and thereafter dial the number of any other intercom station. With relay 7R1 released, the operation of a CNF key and the grounding of lead RGC–1 will turn on transistor 7Q3, reoperate relay 7DR1, and extend a path from ground on lead RGC–1 over back contact 7R1(2) and operated make contact 7DR1(2) to lead RR1 over released back contact 7L1R(5). The ground on lead RR1 signals the allotter to connect a register to this link.

While above operations have been described for removing ringing under the circumstances when the called station does not answer within a reasonable time, the same operations, i.e., the operation of the CNF key at any one of the stations that are already connected to the link, may advantageously be employed to drop busy tone that is applied in lieu of ringing when the called station is found to be busy by the register. Details of register operation under this condition and the release of the link allotter relay under control of the register are discussed hereinafter.

*Station call to trunk*

Figure 1:
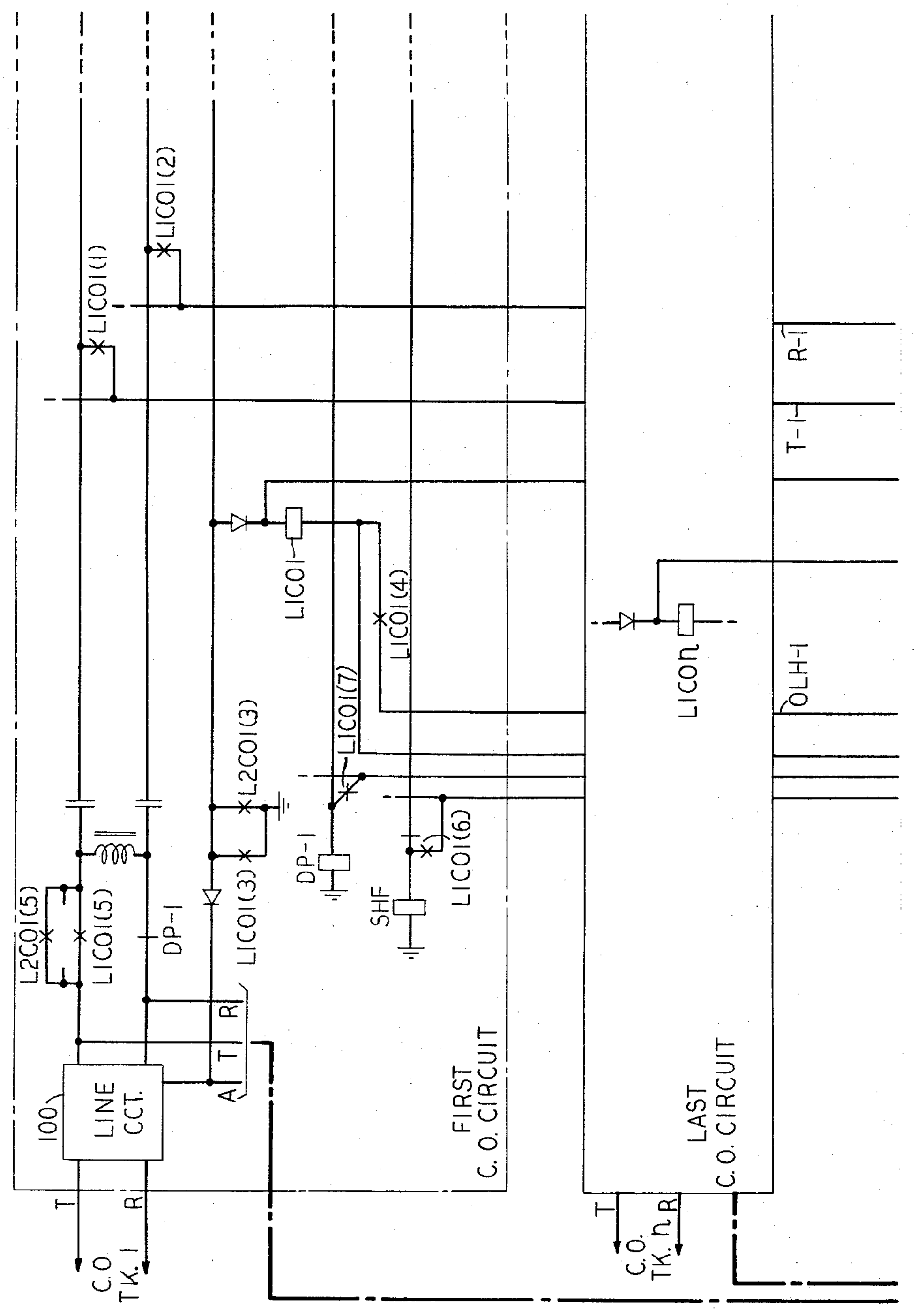
FIGS. 1 through 6 show the arrangement of central office trunk line card circuits, station card circuits, and telephone stations.
Figure 2:
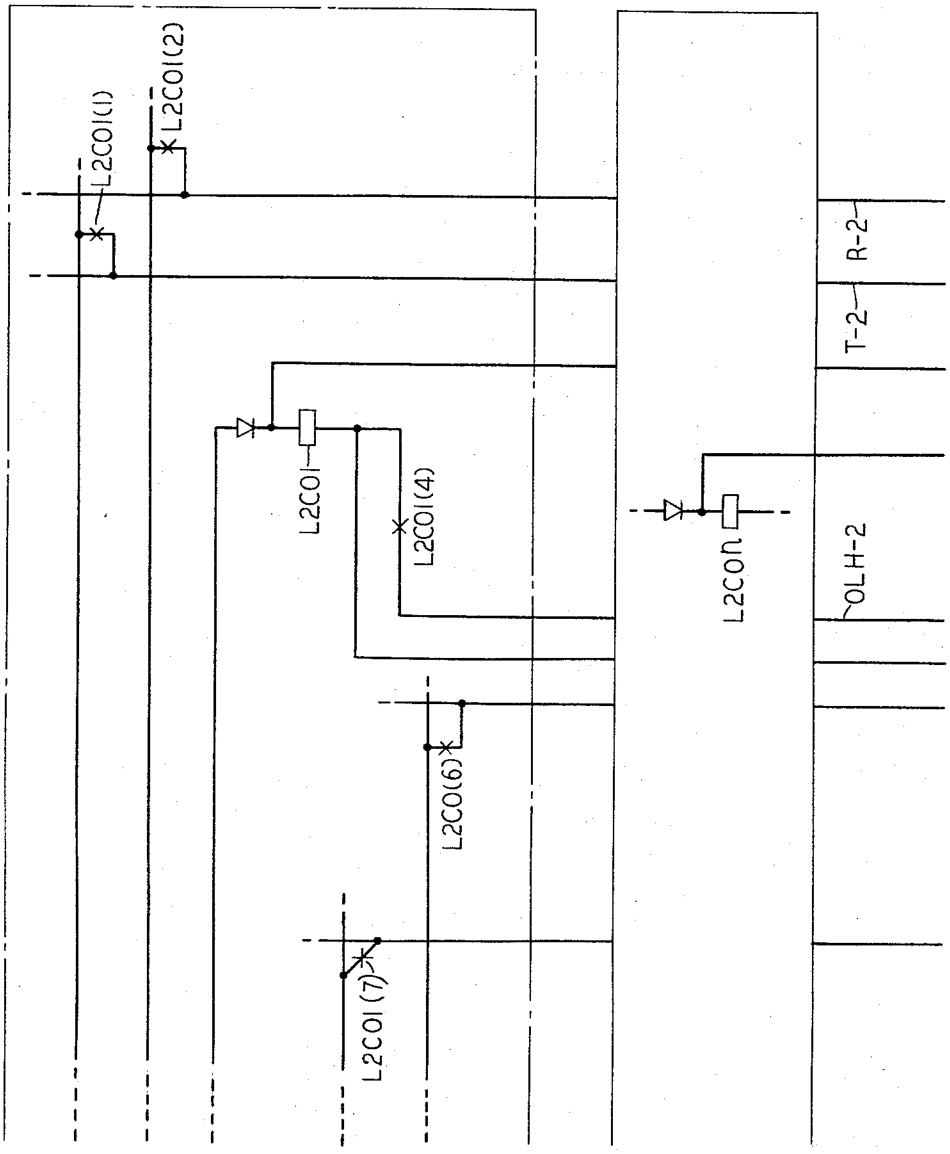

Let it now be assumed that the part at station 3A being connected to station 39 over link 1 desires to place a call over one of the outside lines shown in FIG. 1. To do so, the hold key at station 3A is operated removing ground from the base of transistor 3Q1. Transistor 3Q1 thereupon turns on, operating relay 3H.

Prior to the operation of the hold button at station 3A, transistor 3Q1 is maintained in the off condition by the ground applied to its base over the switchhook contact and the back contact of the hold key and the lowermost make contact of the PUK1 of the intercom pick-up key. When this ground is removed by the operation of the hold key, battery potential applied over the winding of the operated link crosspoint relay, which may be assumed to be relay 3L1A, is applied to the base of transistor 3Q1. This ground may be traced from the winding of relay 3L1A over make contact 3SA(1) and resistor 3R1 to the base of transistor 3Q1. Relay 3H, at its make contact 3H(1), places a holding bridge between the tip and ring conductors of station 3A's line circuit. The holding ground maintains station loop supervisory relay 3SA and link crosspoint relay 3L1A operated. Next, the station user depresses one of the pick-up keys associated with the outside lines shown in FIG. 1.

Let it be assumed that pick-up key PUK1 is operated. The contacts of this key transfer the tip and ring from the station set to the right-hand side of the central office trunk line circuit 100. In the normal manner, the remote central office (not shown) returns dial tone, permitting the station user at station 3A to dial to the desired outside party. When the outside party has answered, the add-on key A/O–1 extends ground to the base of transistor 3Q1 turning it off and causing relay 3H to release and to remove the hold condition. Ground is also extended to the winding of link crosspoint relay L1CO1 in FIG. 1 through make contact 3L1A(8). Battery is provided to the other side of this relay winding over operated make contact 3L1A(9) in FIG. 3. Link crosspoint relay L1CO1 in FIG. 1 operates, connecting the tip and ring at the right-hand side of central office trunk line circuit 100 to the tip and ring of the link. Link crosspoint relay L1CO1 in FIG. 1 operated locks to ground over its make contact L1CO1(3). At its make contact L1CO1(5), the link crosspoint relay extends the continuity of the tip conductor from line circuit 100 to the coupling capacitor. From the coupling capacitor, the tip conductor is extended over make contact L1CO1(1) to the tip conductor of link 1. The ring conductor is extended from the line circuit and the associated capacitor over make contact L1CO1(2) to the ring conductor of link 1. In this manner, the outside party reached through the central office is connected in communications relationship over link 1 to the intercom party on station 39.

If the station user at station 3A desires to disconnect from this conversation, he may replace his receiver on the switchhook without disturbing the conversation between the outside party and station 39. This is because crosspoint relay L1CO1 locks to battery provided on link lead OLH–1 over its make contact L1CO1(4). Battery is applied to lead OLH–1 in FIG. 7 wherein it is connected by a resistor to lead LH–1. Battery will be maintained on lead LH–1 so long as the link is held by station 39. The link is held because of the D–C path between the tip and ring conductors provided by station 39 to the tip and ring conductors of the link which maintains transistors 7Q2 and 7Q1 in the on condition. Should the outside party remain off-hook after station 39 has gone on-hook, the link will not be kept because the outside line is prevented by the coupling capacitor shown in FIG. 1 from providing a D–C path between the tip and ring conductors of the link. Accordingly, the link will release when the last intercom station to which it is connected has returned to the on-hook condition.

In similar manner, if station 3A had been in conversation with an outside line initially and desired to add in one of the intercom stations, the hold button would initially be operated at the station set. Let it be assumed that station 3A had been in conversation with a remote party at central office 1. Pick-up key PUK1 would have been operated prior to the establishment of the connection between station 3A and central trunk line 1. When the hold key is operated, ground is removed from lead A1 causing line circuit 100 in FIG. 1 to hold the central office trunk in the conventional manner. The station user at station 3A would then operate pick-up key PUK1 and dial an intercom station in the normal manner. When the station had answered, add-on key A/O–1 being operated would extend ground over operated make contact 3L1A(8) to the winding of relay L1CO1 in FIG. 1. Battery would be extended to the other side of relay L1CO1 by operated make contact 3L1A(9) in FIG. 3. Relay L1CO1 operated would lock over make contact L1CO1(4) to battery provided over link lead OLH–1, as described previously. Once relay L1CO1 has been operated, station 3A may disconnect without disturbing the connection between the outside line and the other intercom station. Operation of the L1CO1(3) contacts applies ground to the A lead removing the hold from line circuit 100.

*Switchhook flash operation*

Whenever a central office line circuit, such as the first central office circuit or the last central office circuit shown in FIG. 1, is connected to a station via link 1, transistor 7SQ1 in switchhook flash circuit 700 (FIG. 7) will be turned on. Transistor 7SQ1 in the on condition will turn on transistor 7SQ2. Transistor 7SQ2 being turned on turns on transistor 7SQ3 which, in turn, causes transistor 7SQ8 to be turned on. Since link 1 is being used to connect one of the central office circuits of FIG. 1 to one of the stations, transistor 7Q2 will be turned on applying ground to the bases of transistors 7SQ4 and 7SQ5. Transistor 7SQ4 being turned on operates relay 7F. Since transistor 7SQ5 is on, its collector is at battery potential back-biasing transistor 7SQ6 which remains off.

At this time if the station that is connected by link 1 to the central office flashes the switchhook of the associated telephone, transistor 7Q2 will follow the flash momentarily causing transistor 7SQ4 to turn off and release relay 7F in step with the flashes. Similarly, transistor 7SQ5 in turning off removes battery from its collector allowing capacitor 7C1 to charge through resistor 7R1. Since transistor 7SQ7 is off, base current may be supplied to transistor 7Q1 through resistors 7R2 and 7R3. Accordingly, transistor 7Q1 is kept on to maintain the link crosspoint relay of the switchhook flashing station operated even though transistor 7Q2 has momentarily been turned off by the switchhook flash opening the station loop. Transistor 7SQ8 being maintained on bridges make contacts 7R1(1) and 7L1R(3) so that when the "S" relay of the switchhook flashing station releases during the switchhook flash, ground may still be supplied over lead R–DP1 to the winding of the link crosspoint relay for that station. Accordingly, the switchhook flash circuit assures the provision of both battery and ground to the link crosspoint relay for the switchhook flashing station during the interruption in the station loop occasioned by the switchhook flash.

When the switchhook flashing station releases the switchhook, transistor 7Q2 is turned on once again operating transistor 7SQ4 and relay 7F. Capacitor 7C2 which had priorly charged to ground over the back contact of relay 7F's transfer contacts now discharges over the make contact of relay 7F turning on pnpn switch 7SQ9. Switch 7SQ9 being turned on provides battery to operate relay SHW in the first central office circuit in series with make contact 1L1CO1(6). Relay SHF operated, by means of its works contacts (not shown) within line circuit 100, causes a buzzer signal to appear at station 3A and flashing lamp associated with key PUK1. Station 3A acting as attendant may depress key PUK1 and enter the conversation.

On the other hand, if the station connected by link 1 to the first central office circuit of FIG. 1 had operated the switchhook incident to a disconnect, capacitor 7C1 would charge to the Zener voltage of diode 7D1 after a suitable interval of time, turning on transistor 7SQ6 and transistor 7SQ7. Transistor 7SQ7 in turning on interrupts base current to transistor 7Q1, turning transistor 7Q1 off and removing battery from lead LH–1. The removal of battery from lead LH–1 causes the link crosspoint relay of the associated station to release.

Since switchhook flash detection is not required on intercom connections, the switchhook flash circuit 700 disregards any temporary interruption in the station loop circuit. Since no ground potential will be provided to lead OLH–1 when no central office line is connected by link 1 to a station, transistor 7SQ1 will be off, allowing transistor 7SQ7 to be normally on. Transistor 7SQ7 is kept on by base current supplied through the collector resistor associated with transistor 7SQ1. Transistor 7SQ7 in the on condition maintains its collector at battery potential preventing any base current from being applied to transistor 7Q1 when transistor 7Q2 is off. Since transistor 7Q1 will be turned off whenever transistor 7Q2 is turned off, the link crosspoint relay for any station involved in an intercom only connection will be released whenever the associated station goes on-hook.

*Direct outward dialing*

When a station originates a connection to a trunk, as described above, the operation of the L1CO1 relay, for example, connects transistor 7Q10 to the winding of relay DP–1 (FIG. 1). During dialing, the "L" relay of the calling station is kept operated by the operation of the switchhook flash circuit described above. Transistor 7Q10 follows the dialing interruptions in the calling station's loop and controls the relay DP–1 in step with the dial pulses. Advantageously, DP–1 may be of the mercury type to prevent distortion of the dial pulses.

*DSS operation*

Let it be assumed that station 3A desires to converse with station 30 by means of its direct station selection key which forms an alternate and somewhat more rapid method of selecting a station than that provided by dialing. Station 3A removes its switchhook from the cradle and depresses the DSS button labeled for station 30. This button is button DSS1 on the station set. Incident to station 3A going off-hook, a service request was generated and a register assigned by the allotter to an idle link. Let it once again be assumed that link allotter relay 7L1R is operated. Ground is extended over make contact 7L1R(6) to lead LDQ1, over the operated make contact 3L1A(6) of the operated link crosspoint relay 3L1A (FIG. 3), over DSS contact DSS1 to lead 109–1. Lead 109–1 is continued via cable DSS to FIG. 4. From FIG. 4, lead 109–1 is connected to the emitter of transistor 6Q3 in FIG. 6. If station 30 is idle, its station loop supervisory relay 5S30 in FIG. 5 and all of its link crosspoint relays, such as 5L130 and 6L230, will be in the released condition. However, since link 1 is operated, there will be a negative potential on lead LOP–1. This negative potential is applied to the base of transistor 6Q3 turning it on. The negative potential may be traced from lead LOP–1, the diode connecting that lead to the winding of relay 5L130, back contact 5S30(1), back contact 5L130(3), and back contact 6L230(3), to the base of transistor 6Q3. Transistor 6Q3 being turned on grounds lead SEL30 operating link crosspoint relay 5L130. Transistor 6Q3 being turned on also applies ground to lead 110 through diode 6D1.

The ground applied to lead 110 causes the register to operate the "R" relay of the link which applies ringing to the station selected. On the other hand, if the selected station were busy, transistor 6Q3 would not be turned on. Under these circumstances, ground would be applied to the register on lead 109 but not on lead 110. The register responds to ground applied on lead 109 in the absence of ground applied on lead 110 to apply busy tone to the link.

*Register operation, dial tone connection*

When a station goes off-hook, its associated group service request gate activates an input of OR gate 40 (FIG. 4) the output of which grounds lead AN to the allotter (not shown). The allotter applies ground to one of leads L1R, L2R to operate the associated link allotter relay 7L1R in FIG. 7 or 8L2R in FIG. 8 to connect the register to the selected link. When the selected link allotter relay is operated, its make contact 7L1R(6) or 8L2R(6) grounds lead 102 to the register. Ground applied on lead 102 in FIG. 11 operates relay 11B. If the service requesting station is in the 20's or 30's group, ground will also be applied by the associated service request gate to lead 4SR or to lead 6SR, respectively. Ground applied to lead 4SR operates relay 11T2 whereas ground applied to lead 6SR operates relay 11T3. The operated one of these relays transfers the ten output leads from the selector circuit of FIG. 10 to the group of ten sleeve leads in FIG. 4 or 6 of the group of stations including the service requesting station.

When relay 11B operates, its make contact 11B(5) shown in the upper left-hand portion of FIG. 9 applies ground to transistor 9Q13 and to pnpn switch 9Q5. Switch 9Q5 is off at the present time and accordingly the ground signal is continued over lead 103 to the base of transistor 10Q3 in FIG. 10. The ground appearing on lead 102 turns on transistor 10Q18. Transistors 10Q3 and 10Q18 being turned on cause transistor 10Q5 to turn on and to apply a ground pulse to the second emitters of pnpn switches 10Q1 and 10Q2 of the distributor circuit.

Because of the manner in which distributor cores DC1 and DC2 had priorly been reset, the ground pulse applied by transistor 10Q5 tends to switch core DC2. Core DC2 in starting to switch applies a pulse to the base of pnpn switch 10Q2 which then turns on to pulse core SSC1 of the core stepping switch circuit and core DC1 of the distributor circuit. Core SSC1 does not switch on this first pulse applied through pnpn switch 10Q2 because of the manner in which core SSC1 had priorly been reset. The feedback capacitor coupling the collector of transistor 10Q5 to the base of transistor 10Q3 may advantageously be selected together with resistor 10R4 to cause transistors 10Q3 and 10Q5 to free run and produce a pulse approximately every millisecond so long as leads 102 and 103 continue to be grounded. Since the first pulse applied by transistor 10Q5 and coupled through pnpn switch 10Q2 caused distributor core DC1 to switch following the switching of core DC2, on the second pulse applied by transistor 10Q5, distributor core DC1 will again switch and turn on pnpn switch 10Q1. Pnpn switch 10Q1 in turning on applies a pulse to home core SHC of the stepping switch. Core SHC switches and applies a pulse to core SSC1. Core SSC1 switches and enables the base of pnpn switch 10Q21.

If the service requesting line is the one whose sleeve lead is connected to the emitter of pnpn switch 10Q21, the completed station loop will allow pnpn switch 10Q21 to turn on. The conduction of current in pnpn switch 10Q21 causes transistors 10Q11 and 10Q12 to turn on. Transistor 10Q12 in turning on grounds lead 104 to turn on the pnpn switch 9Q5 in FIG. 9. This switch in turning on removes ground from lead 103 turning off transistor 10Q3 of the pulsing circuit. Transistor 10Q12 in turning on also applies a ground pulse to the base of transistor 10Q19. Transistor 10Q19 turns on turning off normally on transistor 10Q17. Transistor 10Q17 in turning off applies a ground pulse to charge capacitor 10CC connected to pnpn switch 10Q30. When transistor 10Q19 turns off due to monostable action with transistor 10Q17, a ground pulse will be applied to the base of pnpn switch 10Q30 turning it on and allowing the charge stored on capacitor 10CC to be discharged. Transistor switch 10Q30 in turning on applies a reset pulse through the reset windings of distributor cores DC1 and DC2 and through the reset windings of each of cores SHC, SSC1, SSC2 through SSC11 of the stepping switch circuit. On the other hand, if the service requesting station was one connected to one of pnpn switches 10Q22 through 10Q20, pulses would be sequentially applied to the bases of these switches until that one was pulsed which was connected to the sleeve of the service requesting station. At this time the operation of transistors 10Q11 and 10Q12 would establish conditions similar to those just described.

When pnpn switch 9Q5 is turned on responsive to the selector pulsing of the service requesting sleeve lead, transistor 9Q3 is turned off. Transistor 9Q3 in turning off turns on transistor 9Q1 which applies battery to lead 121. Battery applied to lead 121 is forwarded over the operated make contact of the link allotter relay 7L1R(1) or 8L2R(1) to operate the link crosspoint relay of the service requesting station.

Dial tone is provided to the station just connected to the link over lead 122. Dial tone is applied to lead 122 through transistor 9Q14 from the dial tone source DT. Transistor 9Q14 is turned on by transistor 9Q13 which was turned on incident to the extension of ground from lead 102 over the make contact 11B(5) of relay 11D. When ground is applied to lead 402 incident to the operation of ground detector transistors 10Q11 and 10Q12, transistor 11Q2 in FIG. 11 is enabled.

Incident to the establishment of dial tone, lead 106 is grounded by the turning on of transistor 9Q13. The grounding of lead 106 turns on transistor 11Q1 (FIG. 11). Transistors 11Q1 and 11Q2 in turning on forward bias diode 11D6 to charge capacitor 11C6. When the link crosspoint relay of the service requesting station is operated ground is removed from lead 402 thereby turning off transistor 11Q2 allowing capacitor 11C6 to turn on transistor 11Q3 which shunts down the winding of the operated one of relays 11T2 or 11T3, releasing the operated relay. Relay 11B remains operated from the ground applied over lead 102 to battery applied over its locking contact 11B(1).

In the illustrative embodiment, it is assumed that there are no single digit stations having the numbers 1, 2, or 3. Accordingly, in FIG. 11 the sleeve leads for these stations are omitted and the only single digit sleeve leads indicated are those for stations 4 through 0. During the pulsing of pnpn switches 10Q21 through 10Q20, incident to the hunting for the service requesting station, transistor 11Q8 in FIG. 11 is inhibited by the presence of battery potential on lead 105. Battery is provided on lead 105 from the collector of transistor 9Q3 which was turned on incident to the forwarding of ground from lead 102 over make contact 11B(5). Transistor 11Q8 being in the off condition prevents pnpn switch 10Q21 from conducting current when its base is pulsed by core SSC1. Similarly, when pnpn switch 10Q2 has its base pulsed by the core stepping switch, current is prevented from flowing because transistor 11Q5 is in the off condition. The pulsing of pnpn switch 10Q23 (not shown) is also ineffective to produce current flow inasmuch as transistor 11Q4 is kept off. The pulsing of any of pnpn switches 10Q24 (not shown) through 10Q20, however, is effective to cause current flow when the pnpn switch is pulsed which is associated with the service requesting station. On the other hand, if either relay 11T2 or 11T3 had been operated by the grounding of leads 4SR or 6SR, the ground pulse applied to the base of pnpn switch 10Q21 would be steered over an operated transfer contact of the appropriate relay to the sleeve lead of either station 21 or 31. Had this station been in the service requesting condition, current would flow over the completed station loop in the usual manner. Similar remarks apply to the pulsing of the second and third of pnpn switches 10Q22 and 10Q23 (not shown).

*Register operation, one-digit dialing*

With the register applying dial tone to lead 122, the calling station may dial either a one or a two-digit code. In the illustrative embodiment, single digit codes are restricted to numbers 4 through 0. This is because the digit 1 is not permitted and because the digits 2 and 3 indicate that a two-digit code is going to be dialed. The dial pulses applied to lead 123 arrive as a sequence of ground pulses rather than as a sequence of "opens" as would be true of conventional dial pulses. The first dial pulse applied to lead 123 turns on pnpn switch 9Q2 to turn off transistor 9Q14 and thereby remove dial tone from lead 122. In FIG. 10, pnpn switch 10Q4 is turned on by the first dial pulse applying battery to the base of transistor 10Q5 of the pulsing circuit. At this time, although ground is provided on lead 102 to turn on transistor 10Q18, there is no ground applied to lead 103 and consequently transistor 10Q3 is not turned on. Transistor 10Q5, accordingly, turns off after the first dial pulse. However, in being turned on momentarily, transistor 10Q5 fires distributor core DC2 and pnpn switch 10Q2 to apply a pulse of the core stepping switch in similar fashion to that described above. Since lead 103 is not grounded, transistor 10Q3 does not turn on and does not form a free running multivibrator with transistor 10Q5. However, when a dial pulse arrives, transistor 10Q5 is turned on charging capacitor 10C4 which in turn turns on transistor 10Q3 during the charging interval which is considerably less than the duration of the dial pulse. Transistor 10Q3 in turning off, turns off transistor 10Q5. Accordingly, the distributor circuit applies pulses to the cores SHC and SSC1 through SSC11 in step with the dial pulses applied to lead 123. Pnpn switch 10Q4 turns off after the first dial pulse. Capacitor 10C1 proceeds to regain the charge which it lost through pnpn switch 10Q4 being turned on. Capacitor 10C1 will continue to re-charge until another dial pulse arrives. So long as dial pulses arrive, the turning on of pnpn switch 10Q4 maintains transistors 10Q6 and 10Q16 in the off condition. Transistor 10Q16 in the off condition provides ground potential at its collector to maintain transistor 10Q11 of the ground detector circuit back-biased. Accordingly, ground detection cannot occur so long as dial pulses arrive.

It will be recalled above that the first pulse delivered by transistor 10Q5 did not result in the switching of core SSC1 of the stepping switch. Accordingly, pnpn switch 10Q21 is not enabled on the first dial pulse. On the second dial pulse, core SHC switches and causes core SSC1 to switch. As each core switches, the base of the associated one of pnpn switches 10Q21 through 10Q20 is pulsed. However, none of the pnpn switches pulsed at this time is effective to apply a ground pulse to the sleeve lead of any line, inasmuch as the ground operating path is open-circuited by transistor 10Q11 being maintained in the off condition by transistor 10Q16.

After the termination of the sequence of dial pulses, pnpn switch 10Q4 is off and capacitor 10C1 re-charges until it has gained sufficient charge to break down Zener diode 10D1 and turn on transistor 10Q16. Transistor 10Q16 in turning on forward-biases transistor 10Q11 and diode 10D3. Diode 10D3 being forward-biased diverts current from the base of normally on transistor 10Q10, turning transistor 10Q10 off. Transistor 10Q10 in turning off, at its collector applies a ground pulse to the base of transistor 10Q3. The ground pulse applied to the base of transistor 10Q3 turns this transistor on causing an additional pulse to be delivered by transistor 10Q5 to the distributor circuit. This pulse turns on the distributor circuit, advancing the state of the core stepping switch to apply a pulse to the base of that one of pnpn switches 10Q21 through 10Q20 subsequent to the one thereof that was pulsed under the control of the dial pulses. The base of this latter pnpn switch being pulsed at a time when a ground path is provided via transistor 10Q11 enables the sleeve lead of the called line to be pulsed. The purpose of providing an additional pulse after the last dial pulse is to assure that ground detector transistor 10Q11 will be enabled prior to the core stepping switch's pulsing the one of pnpn switches 10Q21–10Q20 belonging to the called station. The pulse applied to the sleeve lead of the called line allows that station's link crosspoint relay to be operated.

The operation of transistor 10Q11 causes transistor 10Q12 to turn on if the station is not busy and ground leads 402 and 104. Lead 402 being grounded operates transistor 10Q19 which in turn triggers pnpn switch 10Q30 after a suitable interval. When pnpn switch 10Q30 operates, a reset pulse is applied to distributor cores DC1 and DC2 and to each of cores SHC and SSC1 through SSC10 of the stepping switch. Each of the cores is thereby returned to its normal state. Incident to the turning off of transistor 10Q10, a ground pulse is applied to lead 108. The ground pulse applied on lead 108 is coupled to the base of transistor 9Q8, turning it on. After approximately two milliseconds, transistor 9Q8 turns off applying an enabling ground pulse to the base of pnpn switch 9Q6. Switch 9Q6 being turned on provides low impedance battery to lead 123. The low impedance battery applied to lead 123 at this time operates the "R" relay of the link causing ringing to be applied to the called station. The operation of the "R" relay in the link releases the operated "LR" relay, releasing the register.

If the called station were busy, transistor 10Q12 would not be turned on when the associated one of pnpn switches 10Q21 through 10Q20 were pulsed because a back contact of the already operated link crosspoint relay would open any current path that would otherwise be provided from the sleeve lead to the winding of one of the link crosspoint relays of the called station. Under these circumstances, i.e., the called station being busy, transistor 10Q12 does not turn on and, accordingly, no ground pulse is delivered to lead 104. Transistor 9Q10, accordingly, does not turn on and so the ground pulse output provided at the collector of transistor 9Q8 approximately two milliseconds after the last dial pulse is effective to turn on pnpn switch 9Q12. Transistor switch 9Q12 in turning on allows transistor 9Q11 to be placed in and out of saturation in step with the interrupted ground upon which is superimposed the busy tone signal. Busy tone, accordingly, is applied to lead 122 through transistor 9Q11. Although pnpn switch 9Q6 is turned on by the ground pulse at the collector of transistor 9Q8, the "R" relay of the link is not permitted to operate inasmuch as neither transistor 7QL1 nor transistor 8QL2 in the link can be operated so long as the called station is busy.

*Register operation, two-digit dialing*

On a two-digit call, the dialing of an initial 2 or 3 digit will enable the base of the corresponding pnpn switch of the selector circuit. The pnpn switch so enabled permits a ground path to be completed from ground in FIG. 10 through the base-emitter junction of transistor 10Q12 of the ground detector circuit and the activated pnpn switch through back contacts 11T2–3 and 11T3–3 or 11T2–2 and 11T3–2, respectively, FIG. 11, to either the 11Q5 or 11Q4 transistors and therethrough to operate the corresponding one of relays 11T2 or 11T3. The completion of this current path, however, affords an indication to the ground detector circuit of FIG. 10 which is the same as that obtained upon pulsing the sleeve lead of a service requesting station. To overcome this condition and thereby prevent the release of the transfer relay even before it has had a chance to operate, the ground that is applied through transistor 11Q4 or 11Q5 is applied over back contacts 11T2(2) or 11T3(2) to leads 112 or 113 before the 11T2 or 11T3 relay operates. The ground pulse on lead 112 or 113 will turn on transistor 9Q7 in FIG. 9. Transistor 9Q7 in turning on will prevent pnpn switch 9Q6 from turning on and applying battery to lead 123 and operating any of the "R" relays of the link control circuit (FIGS. 7, 8). The pnpn transistor 9Q6 must be prevented from operating while one of the transfer relays 11T2 or 11T3 is being operated in the transfer circuit responsive to the first dialed digit of a two-digit number. Thus, although a ground pulse is applied to lead 108 when transistor 10Q10 is turned off following the interdigital time out after the first number, the ground pulse on lead 108 is delayed by an appropriate timing interval by the monostable circuit comprising transistors 9Q8 and 9Q9. Once the appropriate one of relays 11T2 or 11T3 has operated, its back contact in lead 112 or 113 removes the operating ground from the base of transistor 9Q7 allowing this transistor to turn off. On the second dial pulse sequence for the two-digit number, the detection of the end of dialing by the dial pulse time-out circuit (FIG. 10) and the application of ground to lead 108 will permit transistor 9Q6 in FIG. 9 to be turned on, which in turn will allow the "R" relay to operate.

The ground pulse applied to lead 108 at the completion of dialing is delayed by two milliseconds in the two millisecond monostable flip-flop comprising transistors 9Q8 and 9Q9, and is then applied through the capacitor diode coupling path to the base of pnpn switch 9Q12. If this purse is applied at a time when the ground detector circuit (FIG. 10) has applied ground to lead 104, transistor 9Q10 will be enabled and the pulse at the output of the two millisecond monostable circuit will be diverted to battery through the collector-emitter path of transistor 9Q10. The operation of the "R" relay mentioned above allows ringing to be applied to the called station and operations proceed normally.

If the called station were busy, however, the ground detector would not apply a ground pulse to lead 104 and transistor 9Q10 will not be enabled. Accordingly, the ground pulse applied to lead 108 at the completion of dialing will, after the two millisecond delay, be connected to the base of pnpn switch 9Q12 turning it on. Prior to switch 9Q12 being turned on, transistor 9Q11 is held in the saturated state by the ground potential applied to its base from the collector of pnpn switch 9Q12. When pnpn switch 9Q12 is turned on, transistor 9Q11 is permitted to be put in and out of saturation by the interrupted ground which is superimposed on busy tone provided through the busy tone interrupter. Busy tone is accordingly coupled intermittently through transistor 9Q11 to lead 122.

*Register operation, direct station selection*

When the DSS key is operated at any station, ground is applied to lead 109. If the selected station is not busy, ground will appear on lead 110. The application of ground to lead 110 enables transistor 9Q10. When ground is applied on lead 109 through the delay network, transistor 9Q10 being on will prevent pnpn switch 9Q12 from turning on and applying busy tone to lead 122. However, if the called station is busy, ground will not be provided to lead 110 and pnpn switch 9Q12 will turn on responsive to the ground applied on lead 109. Pnpn switch 9Q12 in turning on will permit busy tone to be applied to lead 122. When ground is applied to lead 110 because the called station is not busy, pnpn switch 9Q6 is turned on to operate the "R" relay of the link. This now applies ringing to the called DSS station. When ground is applied to lead 109 incident to the request for a DSS station, a ground pulse is applied to the base of pnpn switch 9Q2, turning this switch on. This switch in turning on back-biases transistor 9Q14, removing dial tone from lead 122.

*Register operation, dial "1" cancellation*

In the transfer circuit of FIG. 11, transistor 11Q6 and lead 101 are provided for the purpose of turning off transistor 9Q13 in the register control circuit in the event that a single digit 1 is dialed. The appearance of ground at the output of the No. 1 pnpn switch is applied to the emitter of transistor 11Q6. Transistor 11Q6 turns on because a path is available through its base-emitter junction and Zener diode 11D1 through the collector-emitter junction of transistor 11Q8 to battery. Transistor 11Q6 in turning on grounds lead 101. Ground applied to lead 101 turns off transistor 9Q13 momentarily. Had pnpn switch 9Q2 priorly been turned on, the removal of the ground path occasioned by the turning off of transistor 9Q13 will allow pnpn switch 9Q2 to turn off. Similarly, the turning off of transistor 9Q13 will allow pnpn switches 9Q12 or 9Q6 to turn off. This will prevent the removal of dial tone and prevent the operation of any ringing relay, and prevent the application of busy tone in the event the calling subscriber has fumbled the switchhook to simulate a digit 1.

In the selector circuit (FIG. 10) diode 10D4 couples lead 123 to lead 107. When a connection is initially established to the service requesting station, its L relay operates before its "S" relay operates. This condition is similar to that occurring when a station is dialing, for under these circumstances its L relay remains operated while its S relay releases. To distinguish this condition from a true dial pulse, the pulse applied to lead 123 is coupled through diode 10D4 to lead 107 and is shorted out by transistor 10Q19. Transistor 10Q19 had just been turned on by the operation of the ground detector circuit transistors 10Q11 and 10Q12. Transistor 10Q19 is thereafter turned off by monostable action with transistor 10Q17 as previously described. The diode provided in FIG. 9 from the base of pnpn switch 9Q2 also prevents any dial pulses applied to lead 123 during the monostables on-time of transistor 10Q19 from turning on pnpn switch 9Q2 by applying these dial pulses directly to lead 107 and the short circuit to battery provided by transistor 10Q19. During actual dialing the ground pulses applied to lead 123 are not shorted out through transistor 10Q19 because transistor 10Q19 is not turned on by the current detector circuit until the completion of dialing. As explained above, ground detector transistor 10Q11 is only enabled by the dial pulse time-out circuit after the completion of a dial sequence.

*Register operation, permanent signal release*

When a service requesting station goes off-hook and operates its service request transistor, the allotter (not shown) applies ground to a winding of a link allotter "LR" relay of an idle link. The register applies battery over lead 116 which is common to the other end of all the windings of the "LR" relays. Battery is normally applied by the register to lead 116 from the monostable circuit consisting of transistors 11Q20 and 11Q21 in FIG. 11. Transistor 11Q21 is normally on. Transistor 11Q21 is kept normally on by the ground provided to its base through the base coupling diode. The state of transistors 11Q20 and 11Q21 may be reversed by pnpn switch 11Q19 being turned on which applies a negative potential to the base of transistor 11Q21. Pnpn switch 11Q19 will be turned on in the manner immediately to be described. When the "LR" relay of the link is first operated, a ground pulse is applied to the base of pnpn switch 11Q17. Capacitor 11C1 which had priorly charged to the Zener voltage of diode 11D1 through resistor 11R1 discharges through the path made available by pnpn switch 11Q17 being turned on. After capacitor 11C1 has discharged through the pnpn switch, conduction through the pnpn switch cannot be maintained through the meager current available through resistor 11R1. Capacitor 11C1 then attempts to charge back to ground potential but is prevented from reaching this potential because of the discharge path made available through the base-emitter junction of transistor 11Q18 and Zener diode 11D1. When the Zener breakdown potential of diode 11D1 obtains, the charging current for capacitor 11C1 is diverted through the base-emitter path of transistor 11Q18, Zener diode 11D1, and the base-emitter path of pnpn switch 11Q19, turning this transistor switch on. However, the occurrence of a dial pulse on lead 123 prior to the enabling of the Zener diode path will turn transistor switch 11Q17 on once again, providing an alternate discharge path for capacitor 11C1. Accordingly, pnpn switch 11Q19 will not be turned on unless a suitable interval of the order of eight seconds has elapsed within which no dial pulse has been applied to lead 123. Pnpn switch 11Q19 in turning on reverses the state of monostable flip-flop including transistors 11Q20 and 11Q21. Transistor 11Q21 being turned off removes battery from lead 116, releasing the operated "LR" relay.

*Register operation, miscellaneous features*

Transistors 11Q15, 11Q16 (FIG. 11) and pnpn switch 9Q12 (FIG. 9) provide a means for distinguishing between a ground applied to lead 124 for the purpose of recalling a register to the link and the application of ground to that lead for the purpose of removing busy tone. When ground is applied to lead 124, for the purpose of recalling the register to the link, busy tone will not be present and pnpn switch 9Q12 will be off. Transistor 9Q12 in the off state provides ground to the base of transistor 11Q15 enabling this transistor. When ground is applied to lead 124, transistor 11Q15 turns on, the ground on lead 124 being applied to the collector of transistor 11Q15 by lead 114. Transistor 11Q15 turning on maintains transistor 11Q16 in the off condition. When ground is removed from lead 124, transistor 11Q15 turns off but transistor 11Q16 remains off inasmuch as no ground is provided to its base. Under these circumstances, the ground applied to lead 124 is applied to the base of pnpn switch 9Q5 (FIG. 9) to reset the "start" flip-flop comprising transistors 9Q3 and 9Q5 and prevents the sequential stepping operation from taking place in FIG. 10. The ground applied on lead 124 is continued over to lead 114 in the selector circuit (FIG. 10) to reset the core switches. Dial tone is provided to the recalling station over the link by the setting of the dial tone flip-flop.

On the other hand, when it is detected that the called station is busy, pnpn switch 9Q12 will be operated applying battery to the base of transistor 11Q15, preventing this transistor from turning on when ground is subsequently applied by the station to lead 124 to indicate that busy tone should be removed. The application of ground to lead 124 when transistor 11Q15 is off overcomes Zener diode 11D2 and turns on transistor 11Q16. Transistor 11Q16 in turning on dissipates the charge on capacitor 11C2. When ground is removed from lead 124, transistor 11Q16 turns off removing the discharge path for capacitor 11C2. Capacitor 11C2 then charges through the base-emitter path of pnpn switch 11Q19 turning the switch on. Switch 11Q19 in turning on reverses the state of monostable flip-flop including transistors 9Q20 and 11Q21, and transistor 11Q21 in turning off removes battery from lead 116 releasing the "LR" relays at the link.

To release the register from the link in the event that a station user places his receiver off-hook, receives dial tone, and then replaces the receiver on-hook, the ground applied to lead 123 during this interval will charge capacitor 11C3 to the point where its potential overcomes Zener diode 11D3 and permits switch 11Q19 to be turned on. Switch 11Q19 in turning on changes the state of the monostable flip-flop which controlled the removal of ground from lead 116. Removal of ground from lead 116 releases the "LR" link allotter relays. In this manner an abandoned call is effectively disconnected.

It is understood that the above-described arrangements are merely illustrative of the application of the principles of the invention. Numerous other arrangements may be devised by those skilled in the art without departing from the spirit and scope of the invention.

What is claimed is:

1. A telephone switching system having a plurality of stations and links and means for operating said links to interconnect said stations, said link operating means comprising a station circuit for each of said stations, said station circuit having station loop and sleeve conductors normally extended therethrough, means for applying a pulse serially through said extended sleeve and station loop conductors to detect the closure of a loop current path at any service requesting one of said stations, and means for diverting said pulse from said loop current path and into one of said links to connect said service requesting station to said one of said links.

2. A telephone switching system according to claim 1 wherein said link operating means further comprises means responsive to the connection of said station to said link for receiving called number signals from said station and for controlling said pulse applying means to apply a pulse to the sleeve conductor of the called one of said station circuits.

3. A telephone switching system having a plurality of stations and links and means for operating said links to interconnect said stations, said link operating means comprising a station circuit for each of said stations, said station circuit having station loop conductors normally extended therethrough and a crosspoint relay operable to transfer said extended conductors to a respective one of said links, impedance means connecting the operating winding of said crosspoint relay to said loop conductors, register means for pulsing the impedance means respective to said station circuits, and means thereafter responsive to the occurrence of current flow in said impedance for completing an operating path to said winding of said crosspoint relay.

4. A telephone switching system according to claim 3 wherein said register means includes means responsive to the operation of said crosspoint relay for receiving called numbers signals transmitted over said one of said links and for selectively directing said pulsing means of said register to pulse the impedance means respective to the called one of said station circuits.

5. A telephone switching system according to claim 4 wherein said means for selectively directing said pulsing means comprises a sequential stepping circuit including a plurality of sequentially enabled current elements, a current detector circuit common to said elements, and means for inhibiting said current detector circuit during the transmission of said called number signals.

6. In a telephone switching system having a plurality of links and a plurality of station circuits each having at least one crosspoint relay for connecting the respective station to one of the links, a circuit for finding a service requesting one of said stations and for establishing a communications connection therefrom to another of said plurality of stations comprising means at each service requesting station for completing a branch circuit path to the windings of its respective crosspoint relays, means for sequentially pulsing said crosspoint relay windings of said plurality of station circuits, current detector means responsive to the conduction of current in one of said branch circuit paths for halting said sequential pulsing and for completing an operating path to the last sequentially pulsed one of said crosspoint relays, means responsive to the operation of said last-mentioned crosspoint for inhibiting said current detector means, means for advancing said sequential pulsing circuit in accordance with called number signals transmitted over said last-mentioned one of said links, and means responsive to the termination of said called number signals for uninhibiting said current detector means to complete an operating path to the called one of said station circuit's crosspoint relays.

7. A telephone switching system comprising a plurality of lines and link circuits arranged in a coordinate array, crosspoint means associated with each of said lines, said crosspoint means being operable to connect said line with one of said link circuits, register means, means for connecting said register means with one of said link circuits, means for connecting said register means to a service request signaling one of said lines, said connecting means including means at said register for sequentially applying a current pulse to said line circuits in said array, impedance means for applying said current pulse through a first current path including the switchhook contacts of said service request signaling one of said lines, means responsive to the conduction of current in said first current path for connecting said crosspoint means in shunt with said first current path, said crosspoint means thereupon operating to connect said line to said register over said link, and means for connecting busy ones of said lines with said links, said connecting means interrupting any said first current path to said busy ones of said lines.

8. A telephone switching system comprising a plurality of line circuits and link circuits arranged in a coordinate switching array having a crosspoint at each intersection of one of said line circuits with each of said link circuits, a first crosspoint operating multiple respective to each of said line circuits, a second crosspoint operating multiple respective to each of said link circuits, register means connectable to an idle one of said link circuits responsive to a service request from any of said line circuits, said register having pulsing means for sequentially pulsing said first-mentioned crosspoint operating multiple of said line circuits, means for isolating said register means from said second crosspoint operating multiple, means for detecting current flow in one of said line circuits responsive to said pulsing, and means for connecting said register means to said second crosspoint operating multiple to operate said crosspoint at said intersection of said service requesting one of said line circuits with said one of said link circuits,

9. A telephone switching system in accordance with claim 8 wherein said register means includes gating means in circuit with said detecting means and means for inhibiting said gating means responsive to the operation of said crosspoint.

10. A telephone switching system in accordance with claim 9 wherein said register means includes means for receiving dial pulses and for de-activating said inhibiting means subsequent to the receipt of said dial pulses.

No references cited.

KATHLEEN H. CLAFFY, *Primary Examiner.*

A. H. GESS, *Assistant Examiner.*